(12) United States Patent
Albrecht et al.

(10) Patent No.: US 8,666,970 B2
(45) Date of Patent: Mar. 4, 2014

(54) QUERY PLAN ENHANCEMENT

(75) Inventors: Scott A. Albrecht, Oak Park, IL (US); Joshua Davidson, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 225 days.

(21) Appl. No.: 13/010,136

(22) Filed: Jan. 20, 2011

(65) Prior Publication Data

US 2012/0191698 A1 Jul. 26, 2012

(51) Int. Cl.
G06F 17/30 (2006.01)
G06F 17/00 (2006.01)
G06F 7/00 (2006.01)

(52) U.S. Cl.
USPC .......................................... 707/719; 707/769

(58) Field of Classification Search
USPC .............................. 707/719, 999.001–999.005
See application file for complete search history.

(56) References Cited

U.S. PATENT DOCUMENTS

| | | | |
|---|---|---|---|
| 5,687,362 A * | 11/1997 | Bhargava et al. | 707/999.002 |
| 6,526,403 B1 | 2/2003 | Lin et al. | |
| 7,483,918 B2 | 1/2009 | Chaudhuri et al. | |
| 7,640,238 B2 | 12/2009 | Mordvinov et al. | |
| 2003/0182276 A1 * | 9/2003 | Bossman et al. | 707/3 |
| 2004/0019688 A1 * | 1/2004 | Nickerson et al. | 709/229 |
| 2005/0125427 A1 * | 6/2005 | Dageville et al. | 707/100 |
| 2007/0033159 A1 * | 2/2007 | Cherkauer | 707/2 |
| 2007/0192280 A1 * | 8/2007 | Agrawal et al. | 707/2 |
| 2007/0239673 A1 * | 10/2007 | Barsness et al. | 707/3 |
| 2008/0082489 A1 * | 4/2008 | Chen et al. | 707/3 |
| 2009/0030888 A1 * | 1/2009 | Sahu et al. | 707/5 |
| 2009/0077013 A1 * | 3/2009 | Hu et al. | 707/2 |
| 2009/0240711 A1 * | 9/2009 | Levin | 707/100 |
| 2009/0327242 A1 | 12/2009 | Brown et al. | |
| 2010/0005077 A1 | 1/2010 | Krishnamurthy et al. | |
| 2010/0082599 A1 | 4/2010 | Graefe et al. | |
| 2010/0145929 A1 | 6/2010 | Burger et al. | |
| 2010/0325124 A1 | 12/2010 | Wu et al. | |
| 2011/0010360 A1 * | 1/2011 | Ayoub et al. | 707/719 |

* cited by examiner

Primary Examiner — Kannan Shanmugasundaram
(74) Attorney, Agent, or Firm — Fish & Richardson P.C.

(57) ABSTRACT

Methods, systems, and apparatus, including computer programs encoded on a computer storage medium, for analyzing and enhancing query plans. In one aspect, a method includes receiving a query plan, automatically identifying, by one or more computers, one or more operations included within the query plan that may degrade the performance of a query, and providing a report that identifies the identified operations as performance degrading operations.

28 Claims, 31 Drawing Sheets

File: query_plan.xls
Date: 10/8/2010
ID: 62b6b35-eca7-419c-a0b2-14f21d54804e
Status: FAIL ✗

| Table Name | Rating | Logic Op | Comment | Tips |
|---|---|---|---|---|
| [RESPROJECTS] | FAIL | Clustered Index Scan | The query is performing a Clustered Index Scan on table [RESPROJECTS]. An index is missing. | 📋 |
| [RESOURCE] | FAIL | Clustered Index Scan | The query is performing a Clustered Index Scan on table [RESOURCE]. An index is missing. | 📋 |
| [COUNTRYMASTER] | FAIL | Compute Scalar | The data type passed into the query does not match the data type in table definition | 📋 |
|  | WARNING |  | Query is performing more than 6 table joins | 📋 |
| [CLIENTMASTER] | WARNING |  | The query is retrieving more than 1000 rows from table [CLIENTMASTER]. This operation will likely degrade performance | 📋 |
| [RESOURCE] | WARNING |  | The query is retrieving more than 1000 rows from table [RESOURCE]. This operation will likely degrade performance | 📋 |
| [ENGAGEMENTMASTER] | WARNING |  | The query is retrieving more than 1000 rows from table [ENGAGEMENTMASTER]. This operation will likely degrade performance | 📋 |
| [OPGROUPMASTER] | WARNING |  | The query is retrieving more than 1000 rows from table [OPGROUPMASTER]. This operation will likely degrade performance | 📋 |
| [ENGAGEMENTMASTER] | WARNING |  | The query is retrieving more than 1000 rows from table [ENGAGEMENTMASTER]. This operation will likely degrade performance | 📋 |
| [ENGAGEMENTMASTER] | WARNING |  | The query is retrieving more than 1000 rows from table [ENGAGEMENTMASTER]. This operation will likely degrade performance | 📋 |
| [PROJECT] | WARNING |  | The query is retrieving more than 1000 rows from table [PROJECT]. This operation will likely degrade performance | 📋 |

FIG. 5

```
                     With Index                                      Without Index
CREATE TABLE [dbo].[test_GT_EXPENSES](              CREATE TABLE [dbo].[test_GT_EXPENSES](
    [Exp_Type_ID] [int] NOT NULL,                       [Exp_Type_ID] [int] NOT NULL,
    [Personnel_ID] [char](9) NOT NULL,                  [Personnel_ID] [char](9) NOT NULL,
    [Project_ID] [int] NOT NULL,                        [Project_ID] [int] NOT NULL,
    [Period_EndDate] [datetime] NOT NULL,               [Period_EndDate] [datetime] NOT
    [Exp_Number] [int] NOT NULL,                    NULL,
    [Country_ID] [int] NULL,                            [Exp_Number] [int] NOT NULL,
    [Exp_Date] [datetime] NOT NULL,                     [Country_ID] [int] NULL,
    [Exp_Description] [varchar](60) NULL,               [Exp_Date] [datetime] NOT NULL,
    [LocalAmount] [float] NULL,                         [Exp_Description] [varchar](60)
    [Exch_Rate] [real] NULL,                        NULL,
    [FrgnAmount] [float] NULL,                          [LocalAmount] [float] NULL,
    [SplitDetail] [bit] NOT NULL,                       [LocalAmount_HT] [float] NULL,
    [SplitPercent] [real] NULL,                         [Exch_Rate] [real] NULL,
    [Amx_Exp] [smallint] NOT NULL DEFAULT ((0))         [FrgnAmount] [float] NULL,
) ON [PRIMARY];                                         [SplitDetail] [bit] NOT NULL,
                                                        [SplitPercent] [real] NULL,
CREATE NONCLUSTERED INDEX Index_Personnel_ID ON         [Amx_Exp] [smallint] NOT NULL
dbo.test_GT_EXPENSES                                DEFAULT ((0))
(                                                   ) ON [PRIMARY];
    Personnel_ID, Project_ID
)
WITH( STATISTICS_NORECOMPUTE = OFF, IGNORE_DUP_KEY
= OFF,
ALLOW_ROW_LOCKS = ON, ALLOW_PAGE_LOCKS = ON)
ON [PRIMARY];
GO USE [CopyOf2286_Artes_ESC_V1]                       USE [CopyOf2286_Artes_ESC_V1]
go                                                  go
SET STATISTICS IO ON                                SET STATISTICS IO ON
go                                                  go
select                                              select
personnel_ID,                                       personnel_ID,
exp_number, exp_description                         exp_number, exp_description
from test_gt_expenses                               from test_gt_expenses
where personnel_ID = '010017093'                    where personnel_ID = '010017093'
order by project_ID                                 order by project_ID
```

| | Name | Owner | Type | Created_datetime |
|---|---|---|---|---|
| 1 | GT_EXPENSES | dbo | user table | 2000-10-21 13:49:41.950 |

| | Column_name | Type | Computed | Length | Prec | Scale | Nullable |
|---|---|---|---|---|---|---|---|
| 1 | Exp_Type_ID | int | no | 4 | 10 | 0 | no |
| 2 | Personnel_ID | char | no | 9 | | | no |
| 3 | Project_ID | int | no | 4 | 10 | 0 | no |
| 4 | Period_EndDate | datetime | no | 8 | | | no |
| 5 | Exp_Number | int | no | 4 | 10 | 0 | no |
| 6 | Country_ID | int | no | 4 | 10 | 0 | yes |

FIG. 8A

| | index_name | index_description | index_keys |
|---|---|---|---|
| 1 | Index_Personnel_ID | nonclustered located on PRIMARY | Personnel_ID |

FIG. 8B

With Implicit Conversion

```
use [2286_Artes_UK_V1]
go
SET STATISTICS IO ON
go
select * from gt_expenses          ⌒806
where personnel_ID = 010001430
```

```
(280 row(s) affected)
Table 'GT_EXPENSES'. ⌒808
Scan count 17, ⌒814
logical reads 30545,
physical reads 0,
read-ahead reads 0,
lob logical reads 0,
lob physical reads 0,
lob read-ahead reads 0.
Table 'Worktable'.
Scan count 0,
logical reads 0,
physical reads 0,
read-ahead reads 0,
lob logical reads 0,
lob physical reads 0,
lob read-ahead reads 0.
```

Without Implicit Conversion

```
use [2286_Artes_UK_V1]
go
SET STATISTICS IO ON
go
select * from gt_expenses          ⌒810
where personnel_ID = '010001430'
```

```
(280 row(s) affected)
Table 'GT_EXPENSES'. ⌒812
Scan count 1, 
logical reads 1153, ⌒816
physical reads 0,
read-ahead reads 0,
lob logical reads 0,
lob physical reads 0,
lob read-ahead reads 0.
```

FIG. 8C

900

| With <Excessive Joins> 902 | Without <Excessive Joins> 904 |
|---|---|
| Use Test<br>go<br>set statistics io on<br>go<br>Select b.PeopleKey, a.PersonnelNumber,<br>b.FirstName, B.MiddleInitial,<br>B.LastName, C.InternetMail,<br>c.OfficePhone,<br>d.XWorkForceCareerLvlDescr,<br>E.LocationDescription,<br>E.MetroCityDescription,<br>F.BusinessOrgDescription,<br>F.CompetencyGroupDescription,<br>F.ResourceGroup, g.originalhiredt,<br>g.status<br>From PersonnelID a<br>inner join Person b<br>on a.personnelnumber =<br>b.personnelnumber<br>inner join Contact c<br>on a.personnelnumber =<br>c.PersonnelNumber<br>inner join Level d<br>on a.personnelnumber =<br>d.PersonnelNumber<br>inner join Location e<br>on a.personnelnumber =<br>e.personnelnumber<br>inner join Organization f<br>on a.personnelnumber =<br>f.personnelnumber<br>inner join Employmentstatus g<br>on a.personnelnumber =<br>g.personnelnumber | Use Test<br>go<br>set statistics io on<br>go<br>Select a.PeopleKey, a.PersonnelNumber,<br>a.FirstName, a.MiddleInitial,<br>a.LastName,<br>b.InternetMail, b.OfficePhone,<br>a.XWorkForceCareerLvlDescr,<br>c.LocationDescription,<br>c.MetroCityDescription,<br>a.BusinessOrgDescription,<br>a.CompetencyGroupDescription,<br>a.ResourceGroup,<br>a.originalhiredt, a.status<br>from dbo.person_tbl a<br>join Contact b<br>on a.personnelnumber =<br>b.PersonnelNumber<br>join Location c<br>on a.personnelnumber =<br>c.personnelNumber |

FIG. 9A

| With <Excessive Joins> 902 | Without <Excessive Joins> 904 |
|---|---|
| I/O Statistics 906 | I/O Statistics 908 |
| Table 'PersonnelID'. Scan count 3, logical reads 1701, physical reads 762, read-ahead reads 1547, lob logical reads 0, lob physical reads 0, lob read-ahead reads 0. | Table 'Person_tbl'. Scan count 3, logical reads 14436, physical reads 24, read-ahead reads 13117, lob logical reads 0, lob physical reads 0, lob read-ahead reads 0. |
| Table 'Level'. Scan count 3, logical reads 7733, physical reads 5, read-ahead reads 7045, lob logical reads 0, lob physical reads 0, lob read-ahead reads 0. | Table 'Location'. Scan count 3, logical reads 10708, physical reads 1, read-ahead reads 9407, lob logical reads 0, lob physical reads 0, lob read-ahead reads 0. |
| Table 'EmploymentStatus'. Scan count 3, logical reads 6551, physical reads 5, read-ahead reads 5969, lob logical reads 0, lob physical reads 0, lob read-ahead reads 0. | Table 'Contact'. Scan count 3, logical reads 10974, physical reads 0, read-ahead reads 9994, lob logical reads 0, lob physical reads 0, lob read-ahead reads 0. |
| Table 'Contact'. Scan count 3, logical reads 10974, physical reads 4, read-ahead reads 9999, lob logical reads 0, lob physical reads 0, lob read-ahead reads 0. | Table 'Worktable'. Scan count 0, logical reads 0, physical reads 0, read-ahead reads 0, lob logical reads 0, lob physical reads 0, lob read-ahead reads 0. |
| Table 'Location'. Scan count 3, logical reads 10708, physical reads 4, read-ahead reads 9758, lob logical reads 0, lob physical reads 0, lob read-ahead reads 0. | |
| Table 'Worktable'. Scan count 0, logical reads 0, physical reads 0, read-ahead reads 0, lob logical reads 0, lob physical reads 0, lob read-ahead reads 0. | |
| Table 'Organization'. Scan count 1, logical reads 4985, physical reads 3, read-ahead reads 4981, lob logical reads 0, lob physical reads 0, lob read-ahead reads 0. | |
| Table 'Person'. Scan count 3, logical reads 4803, physical reads 5, read-ahead reads 4369, lob logical reads 0, lob physical reads 0, lob read-ahead reads 0. | |
| Table 'Worktable'. Scan count 0, logical reads 0, physical reads 0, read-ahead reads 0, lob logical reads 0, lob physical reads 0, lob read-ahead reads 0. | |

FIG. 9B

| | Name | Owner | Type | Created_datetime |
|---|---|---|---|---|
| 1 | EMPLOYEE | dbo | user table | 2009-12-04 01:56:52.020 |

| | Column_name | Type | Computed | Length | Prec | Scale | Nullable | TrimTrailingBlanks | FixedLenNullInSource | Collation |
|---|---|---|---|---|---|---|---|---|---|---|
| 1 | PROJECTID | int | no | 4 | 10 | 0 | yes | (n/a) | (n/a) | NULL |
| 2 | LASTNAME | varchar | no | 20 | | | yes | no | yes | SQL_Latin1_General_CP850_CI_AI |

| | Identity | Seed | Increment | Not For Replication |
|---|---|---|---|---|
| 1 | No identity column defined | NULL | NULL | NULL |

| | RowGuidCol |
|---|---|
| 1 | No rowguidcol column defined |

| | Data_located_on_filegroup |
|---|---|
| 1 | PRIMARY |

| | index_name | index_description | index_keys |
|---|---|---|---|
| 1 | IDX_EMP_PROJ_ID | clustered located on PRIMARY | PROJECTID |

| | Name | Owner | Type | Created_datetime | | | | | | |
|---|---|---|---|---|---|---|---|---|---|---|
| 1 | PROJECT | dbo | user table | 2009-12-04 01:56:59.313 | | | | | | |

| | Column_name | Type | Computed | Length | Prec | Scale | Nullable | TrimTrailingBlanks | FixedLenNullInSource | Collation |
|---|---|---|---|---|---|---|---|---|---|---|
| 1 | PROJECTID | int | no | 4 | 10 | 0 | no | (n/a) | (n/a) | NULL |
| 2 | PROJECTNAME | varchar | no | 20 | | | yes | no | yes | SQL_Latin1_General_CP850_CI_AI |

| | Identity | Seed | Increment | Not For Replication |
|---|---|---|---|---|
| 1 | No identity column defined. | NULL | NULL | NULL |

| | RowGuidCol |
|---|---|
| 1 | No rowguidcol column defined. |

| | Data_located_on_filegroup |
|---|---|
| 1 | PRIMARY |

| | index_name | index_description | index_keys |
|---|---|---|---|
| 1 | PK_PROJECT__07020F21 | clustered, unique, primary key located on PRIMARY | PROJECTID |

| | constraint_type | constraint_name | delete_action | update_action | status_enabled | status_for_replication | constraint_keys |
|---|---|---|---|---|---|---|---|
| 1 | PRIMARY KEY (clustered) | PK_PROJECT__07020F21 | (n/a) | (n/a) | (n/a) | (n/a) | PROJECTID |

Figure 10F:
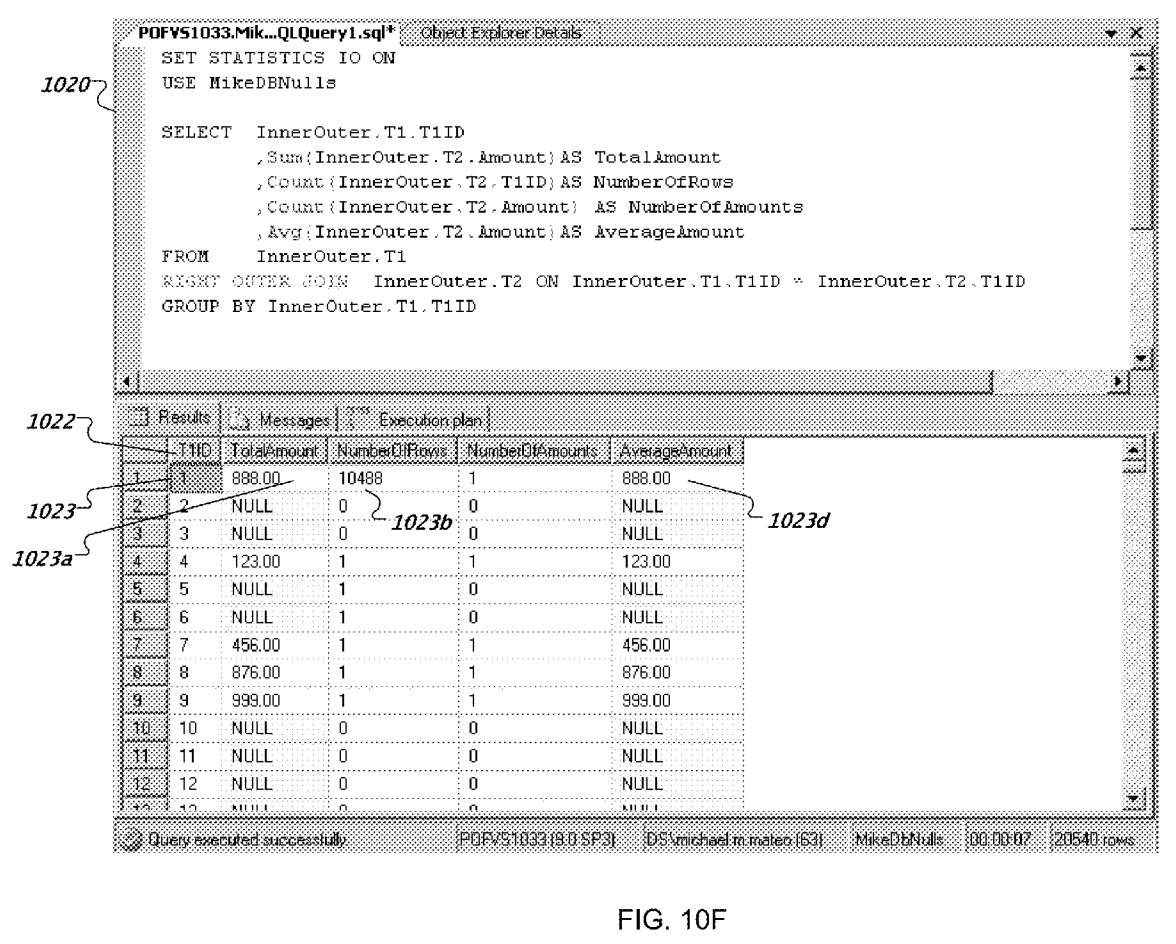

```
SET STATISTICS IO ON
USE MikeDBNulls

SELECT  InnerOuter.T1.T1ID
        ,Sum(InnerOuter.T2.Amount) AS TotalAmount
        ,Count(InnerOuter.T2.T1ID) AS NumberOfRows
        ,Count(InnerOuter.T2.Amount) AS NumberOfAmounts
        ,Avg(InnerOuter.T2.Amount) AS AverageAmount
FROM    InnerOuter.T1
RIGHT OUTER JOIN  InnerOuter.T2 ON InnerOuter.T1.T1ID = InnerOuter.T2.T1ID
GROUP BY InnerOuter.T1.T1ID
```

| T1ID | TotalAmount | NumberOfRows | NumberOfAmounts | AverageAmount |
|------|-------------|--------------|-----------------|---------------|
|      | 888.00      | 10488        | 1               | 888.00        |
| 2    | NULL        | 0            | 0               | NULL          |
| 3    | NULL        | 0            | 0               | NULL          |
| 4    | 123.00      | 1            | 1               | 123.00        |
| 5    | NULL        | 1            | 0               | NULL          |
| 6    | NULL        | 1            | 0               | NULL          |
| 7    | 456.00      | 1            | 1               | 456.00        |
| 8    | 876.00      | 1            | 1               | 876.00        |
| 9    | 999.00      | 1            | 1               | 999.00        |
| 10   | NULL        | 0            | 0               | NULL          |
| 11   | NULL        | 0            | 0               | NULL          |
| 12   | NULL        | 0            | 0               | NULL          |

| 1102 | 1104 |
|---|---|
| With Temp Tables | Without Temp Tables |
| --Temporary table<br><br>USE [CopyOf2286_Artes_ESC_V1]<br>go<br>SET STATISTICS IO ON<br>go<br>CREATE TABLE [dbo].[#tmp_gt_personnel](<br>    [Personnel_ID] [char](9) NOT NULL,<br>    [Classification_ID] [int] NOT NULL,<br>    [Category_ID] [char](3) NOT NULL,<br>    [Country_ID] [int] NOT NULL,<br>    [Region_ID] [char](5) NOT NULL,<br>    [GMU_ID] [char](4) NOT NULL,<br>    [LMU_ID] [char](3) NULL,<br>    [FirstName] [varchar](30) NOT NULL,<br>    [MidName] [varchar](30) NULL,<br>    [LastName] [varchar](30) NOT NULL,<br>    [DateValidate] [datetime] NULL DEFAULT (getdate()),<br>    [MethodOfTravel] [char](15) NULL,<br>    [SendAmexFile] [bit] NOT NULL DEFAULT (0),<br>    [Review] [varchar](255) NULL DEFAULT ('N/A'),<br> CONSTRAINT [PK_GT_PERSONNEL] PRIMARY KEY CLUSTERED<br>(<br>    [Personnel_ID] ASC<br>)WITH (PAD_INDEX = OFF, STATISTICS_NORECOMPUTE = OFF, IGNORE_DUP_KEY = OFF, ALLOW_ROW_LOCKS = ON, ALLOW_PAGE_LOCKS = ON, FILLFACTOR = 90) ON [PRIMARY]<br>) ON [PRIMARY]<br><br>INSERT #tmp_gt_personnel<br>SELECT * FROM gt_personnel<br><br>SELECT LastName, FirstName<br>FROM #tmp_gt_personnel<br>WHERE LastName = 'harley-peters'<br>ORDER BY FirstName<br><br>DROP TABLE #tmp_gt_personnel | --Derived table<br><br>USE [CopyOf2286_Artes_ESC_V1]<br>go<br>SET STATISTICS IO ON<br>go<br>SELECT LastName, FirstName    ⎬ *1106*<br>FROM<br>  (SELECT * FROM gt_personnel<br>   WHERE gmu_ID = 3101) AS gtp_DerivedTable<br>WHERE LastName = 'harley-peters'<br>ORDER BY FirstName |

FIG. 11A

| With Temp Tables | Without Temp Tables |
|---|---|
| --Temporary table<br>I/O Statistics: ⌐1108<br><br>Table '#tmp_gt_personnel<br>000000048982'.<br>Scan count 0,<br>logical reads 3239,<br>physical reads 0,<br>read-ahead reads 0,<br>lob logical reads 0,<br>lob physical reads 0,<br>lob read-ahead reads 0.<br><br>Table 'GT_PERSONNEL'.<br>Scan count 1,<br>logical reads 26,<br>physical reads 0,<br>read-ahead reads 0,<br>lob logical reads 0,<br>lob physical reads 0,<br>lob read-ahead reads 0.<br><br>(1567 row(s) affected)<br><br>(1 row(s) affected)<br><br>Table '#tmp_gt_personnel<br>000000048982'.<br>Scan count 1,<br>logical reads 24,<br>physical reads 0,<br>read-ahead reads 0,<br>lob logical reads 0,<br>lob physical reads 0,<br>lob read-ahead reads 0. | --Derived table<br>I/O Statistics: ⌐1110<br><br>(1 row(s) affected)<br>Table 'GT_PERSONNEL'.<br>Scan count 1,<br>logical reads 26,<br>physical reads 0,<br>read-ahead reads 0,<br>lob logical reads 0,<br>lob physical reads 0,<br>lob read-ahead reads 0. |

FIG. 11B

QUERY PLAN ENHANCEMENT

BACKGROUND

This specification describes systems and processes for querying a database, in general, and for enhancing query plans, in particular.

A query language may include one or more operations for accessing and managing data in a relational database. A user may implement a query plan using the query language to find and access data in the database. For example, the database may be stored on a server and the user may access the server from a client device by way of a network. The user may create the query plan in the query language on the client device. The user may send the query plan to the server in order to access and manage the database.

The query plan allows the user to describe the desired data they would like to access from the database in the form of a database query. A database manager, running on the server, may control the creation, maintenance and use of the database. The database management system may plan, optimize and perform the operations needed to produce the desired data from the database as requested by the database query. The server may then provide the data to the user on the client device by way of the network.

SUMMARY

In general, one innovative aspect of the subject matter described in this specification may be embodied in systems and processes used for evaluating a database query. A query plan may define a process used by a database management system (DBMS) to control the managing and accessing of data included in a database (e.g., a relational database). In some cases, the query plan may be used to implement a database query where the query may not request the data from the database in the most efficient manner. A knowledge base may include a set of rules used to evaluate the effectiveness and efficiency of the query plan. A query plan evaluator may use the knowledge base.

For example, the query plan evaluator may run on a server that includes the database. The user may use a client device communicatively coupled to the server by way of a network. The client device may include a user interface (e.g., a graphical user interface implemented on a display device). The user, using the client device, may create a query plan in order to manage and access data included in the database on the server. The user can send the query plan to the server. The query plan evaluator may evaluate the query plan against a predetermined set of rules included in a knowledge base. The evaluation may determine that the query plan violates one or more of the rules in the knowledge base. In some implementations, if the query plan evaluator determines that the query plan violates or potentially violates one or more of the rules in the knowledge base, the query plan evaluator may additionally identify one or more areas of the query plan that are in violation. In addition, the query plan evaluator may provide suggestions as to how to redo or fix the database query by suggesting modifications to the query plan.

In general, another innovative aspect of the subject matter described in this specification may be embodied in methods that include the actions of receiving a query plan, automatically identifying, by one or more computers, one or more operations included within the query plan that may degrade the performance of a query, and providing a report that identifies the identified operations as performance degrading operations.

In general, another innovative aspect of the subject matter described in this specification may be embodied in methods that include the actions of receiving the query plan, evaluating the query plan, identifying, based on the evaluation, one or more performance degrading operations within the query plan, and providing a report that identifies the performance degrading operations within the query plan.

Other embodiments of these aspects include corresponding systems, apparatus, and computer programs, configured to perform the actions of the methods, encoded on computer storage devices.

These and other embodiments may each optionally include one or more of the following features. For instance, the actions include automatically modifying one or more of the identified operations; the actions include automatically deleting one or more of the identified operations; automatically identifying the one or more operations further comprises automatically identifying a request to perform a table scan; the actions include suggesting parameters for a new index in response to automatically identifying the request to perform a table scan; automatically identifying one or more operations further comprises automatically identifying a request to create or use a temporary table; automatically identifying a request to create or use a temporary table further comprises automatically identifying a "create table" command in context with a hash character; automatically identifying one or more operations further comprises automatically identifying a request to perform an outer join operation; automatically identifying one or more operations further comprises further comprises automatically identifying a request to perform an implicit conversion; automatically identifying a request to perform an implicit conversion operation further comprises automatically identifying a "convert_implicit" command; automatically identifying one or more operations further comprises automatically identifying more than a predetermined number of table join operations; the predetermined number is five; automatically identifying one or more operations further comprises automatically identifying a request to return distinct query results; automatically identifying a request to return distinct query results further comprises identifying a "select distinct" command; automatically identifying one or more operations further comprises automatically identifying that a query returns more than a predetermined amount of data; the predetermined amount comprises one thousand rows; automatically identifying that a query returns more than a predetermined amount of data further comprises automatically determining that a value associated with a "row count" parameter exceeds the predetermined amount; the query plan is encoded in an extensive markup language document; a performance degrading operation is one of an outer join, a table scan, or an implicit conversion; the performance degrading operations comprise an more than a predetermined number of table joins; the performance degrading operations comprise a query returning more than a predetermined number of rows of data; the performance degrading operations comprise operations that use the DISTINCT keyword in a SELECT statement; the performance degrading operations comprise operations that use a temporary table; the actions include altering the query plan to remove one or more performance degrading operations; the report includes a score for the query plan, one or more ratings for the query plan and a reason for the rating, and a hyperlink to a tip for each of the one or more ratings, the tip providing further information regarding the rating and the reason for the rating; and/or the tip is included in an article associated with the hyperlink.

Particular embodiments of the subject matter described in this specification may be implemented to realize one or more of the following advantages. Specifically queries are performed faster, and use fewer computational resources. Operations within the query plan that waste system resources, or that are a result of bad coding practices, are automatically identified or removed. A programmer may be taught alternative, better coding practices based on that programmer's actual, past bad practices.

The details of one or more embodiments of the subject matter described in this specification are set forth in the accompanying drawings, and the description, below. Other features, aspects and advantages of the subject matter will be apparent from the description and drawings, and from the claims.

BRIEF DESCRIPTION OF DRAWINGS

Referring now to the drawings, in which like reference numbers represent corresponding parts throughout:

FIG. 5 is a screen shot of a results page for display on a display device.

FIGS. 6A-C illustrate an example comparison table showing structured query language (SQL) operations performed in order to access data in a database table.

FIGS. 8A-F illustrate an example of the use of implicit conversions.

FIGS. 9A-E illustrate an example of the use of table joins.

FIGS. 10A-H illustrate an example of the use of outer joins.

FIGS. 11A-D illustrate an example of the use of temporary tables with database queries.

DETAILED DESCRIPTION

Figure 1:
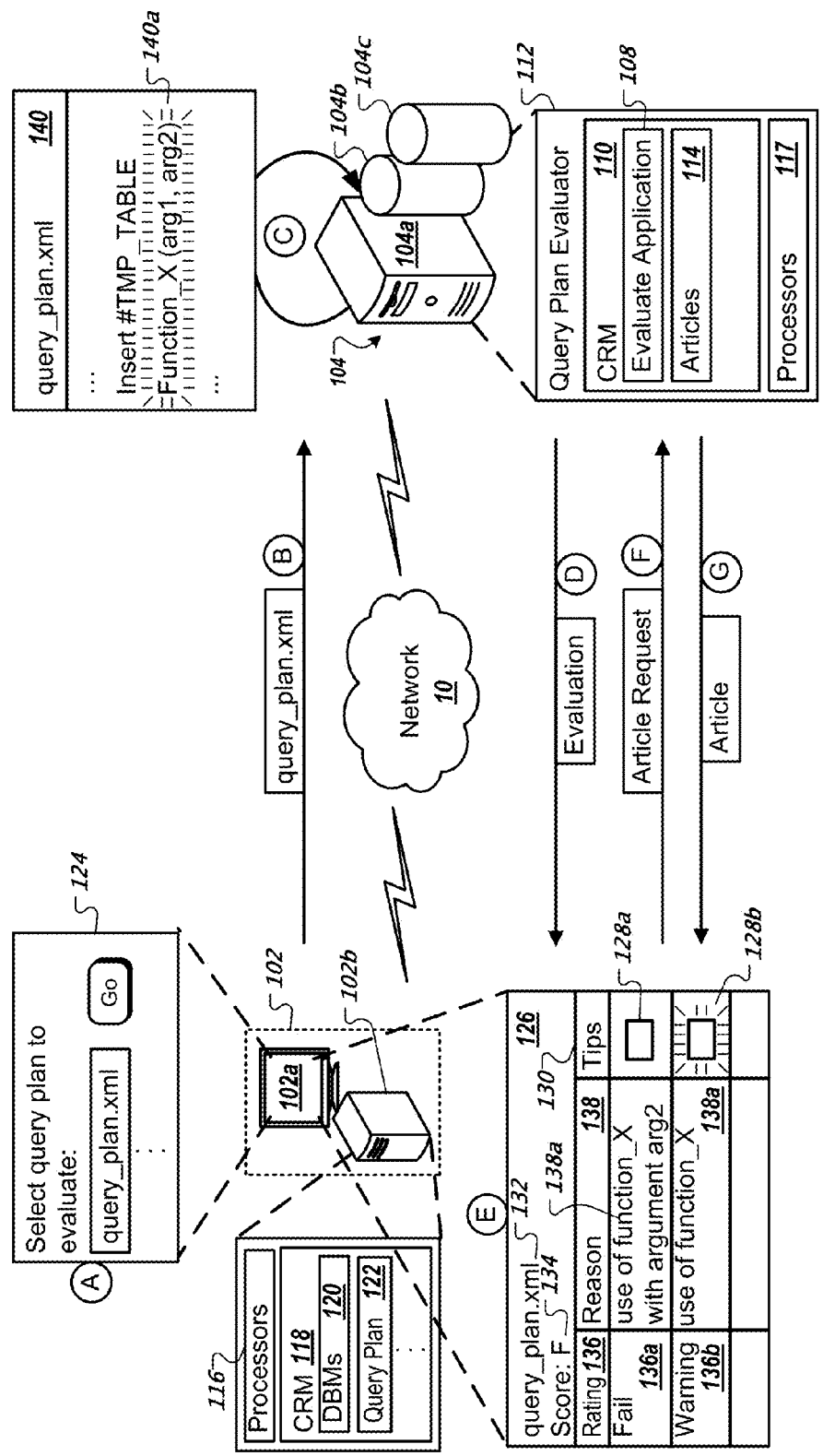
FIG. 1 is a block diagram illustrating an example system that can execute implementations of the present disclosure.

FIG. 1 is a block diagram illustrating an example system 100 that may execute implementations of the present disclosure. The system 100 includes a client computing system 102 and a server computing system 104. The client computing system 102 includes a display device 102a and a client device 102b. The server computing system 104 includes a server 104a, an evaluator database 104b, and an information database 104c. The client computing system 102 can communicate with the server computing system 104 by way of network 106. In some implementations, the client computing system 102 may be directly connected to the server computing system 104 (without connecting by way of network 106).

The client computing system 102 may represent various forms of processing devices including, but not limited to, a desktop computer, a laptop computer, and a handheld computer. The client computing system 102 may access application software on the server computing system 104. The server computing system 104 can represent various forms of servers including, but not limited to a web server, an application server, a proxy server, a network server, or a server farm. For example, the server computing system 104 can include an application server that executes software accessed by client computing system 102.

In operation, the client computing system 102 can communicate with the server computing system 104 by way of network 106. The client device 102b can include one or more central processing units (CPUs) (processors 116) that may execute programs and applications included on the client device 102b. The client device 102b includes a customer relationship management module (CRM) module 118 that includes a database management system 120 and a query plan application 122. The database management system 120 can include one or more applications that control the creation, management, access and use of the information database 104c. The client device 102b may use the database management system 120 to manage and access the information database 104c. The database management system 120 may use the query plan application 122 to create and manage database queries to the information database 104c. In addition, the server computing system 104 may include a query processor that uses one or more central processing units (CPUs) (processors 117) to process and execute a query plan.

For example, a user of the client computing system 102 may use the query plan application 122 to create a query plan for use by the database management system 120. The query plan can include queries of selected data in the database the user would like to access and manage. The query plan allows the user to describe one or more queries in order to access and manage the desired data in the database. The database management system 120 uses the query plan to optimize and perform the physical operations related to the database queries that includes the access of the information database 104c in order to produce the necessary resulting data from the information database 104c for the user.

A query plan is a document used by the database management system 120 that encodes one or more language elements such as expressions, statements and queries using a set of rules. The client computing system 102 may locally store the resulting query plan document (e.g., an Extensible Markup Language (XML) document) in memory included in the client computing system 102. In addition, the client computing system 102 may send the query plan to the server computing system 104 for evaluation by a query plan evaluate application 108.

In some implementations, the query plan may be a document encoded using a set of rules based on one of various XML-based languages that can include but are not limited to Really Simple Syndication (RSS), Atom Syndication Format (Atom), and Simple Object Access Protocol (SOAP). In some implementations, the query plan may be a document encoded using a proprietary set of rules.

For example, a user of the client computing system 102 can select a query plan to evaluate from one or more query plans in a query plan list 124 displayed in a user interface on the display device 102a (state A). Once the user selects a query plan for evaluation (e.g., the query plan encoded in the "query_plan.xml" selected document), the client computing system 102 can send the query plan document (e.g., query_plan.xml) to the server computing system 104 by way of network 106 (state B). The server 104a, using processors 117, executes the query plan evaluate application 108 included in a server customer relationship management (CRM) module 110 that is part of a query plan evaluator 112.

The query plan evaluate application 108 evaluates the query plan encoded in the query plan document (e.g., query_plan.xml) received from the client computing system 102. For example, in order to evaluate the query plan, a parser (e.g., an XML parser) analyzes the encoded information in the query plan document (e.g., query_plan.xml) to produce a structured list of the language elements 140 such as expressions, statements and database queries that comprise the query plan. The query plan evaluate application 108 can evaluate the query plan against a set of knowledge rules stored, for example, in the evaluator database 104b. The query plan evaluate application 108 may identify one or more knowledge rules violated by the query plan. For example, the query plan evaluate application 108 can identify a language element 140a as responsible for violating a knowledge rule (state C).

The server computing system 104 provides the results of the query plan evaluation by the query plan evaluate application 108 to the client computing system 102 (state D). For example, the client computing system 102 can display the results of the query plan evaluation in a query plan evaluation results table 126 for display in a user interface on the display device 102a (state E). In addition, the query plan evaluator 112 may provide one or more articles 114 that include suggestions as to how to rewrite or correct the query plan with respect to the identified one or more violated rules. The server computing system 104 can provide hyperlinks to the one or more articles 114 for inclusion in the query plan evaluation results table 126. The hyperlinks can be included in a Tips column 130 in the results table 126.

The results table 126 includes the name of the query plan document 132 (e.g., "query_plan.xml"). The query plan evaluate application 108 may assign a score 134 to the query plan. For example, the query plan evaluate application 108 assigned a score of "F" (a failing score) to the query plan in the document named "query_plan.xml". Subsequently, the user may rewrite the query plan in order to improve its evaluation score. A ratings column 136 and a reason column 138 along with the articles associated with the hyperlinks in the tips column 130 may help the user when rewriting or otherwise modifying the query plan. For example, the ratings column 136 indicates a rating 136 (e.g., rating 136a) associated with a reason (e.g., reason 138a) for the rating in the reason column 138. The reason for the rating (e.g., reason 138a) may identify a problem or issue with respect to a language element in the query plan. In addition, a hyperlink to a tip article (e.g., tip 128a, a hyperlink to an article included in the articles 114) may help the user when rewriting the query plan to correct the problem identified by the query evaluation application 108.

The user may activate the hyperlink of tip 128a. The client computing system 102 requests the article associated with the hyperlink of tip 128a from the query plan evaluator 112 included in the server computing system 104 (state F). In response to the request, the server computing system 104 provides the article to the client computing system 102 (state G). For example, the client computing system 102 can display the article to the user on display device 102a. The user can then read the article and determine one or more modifications to the query plan to correct for the identified rule violation.

Figure 2:
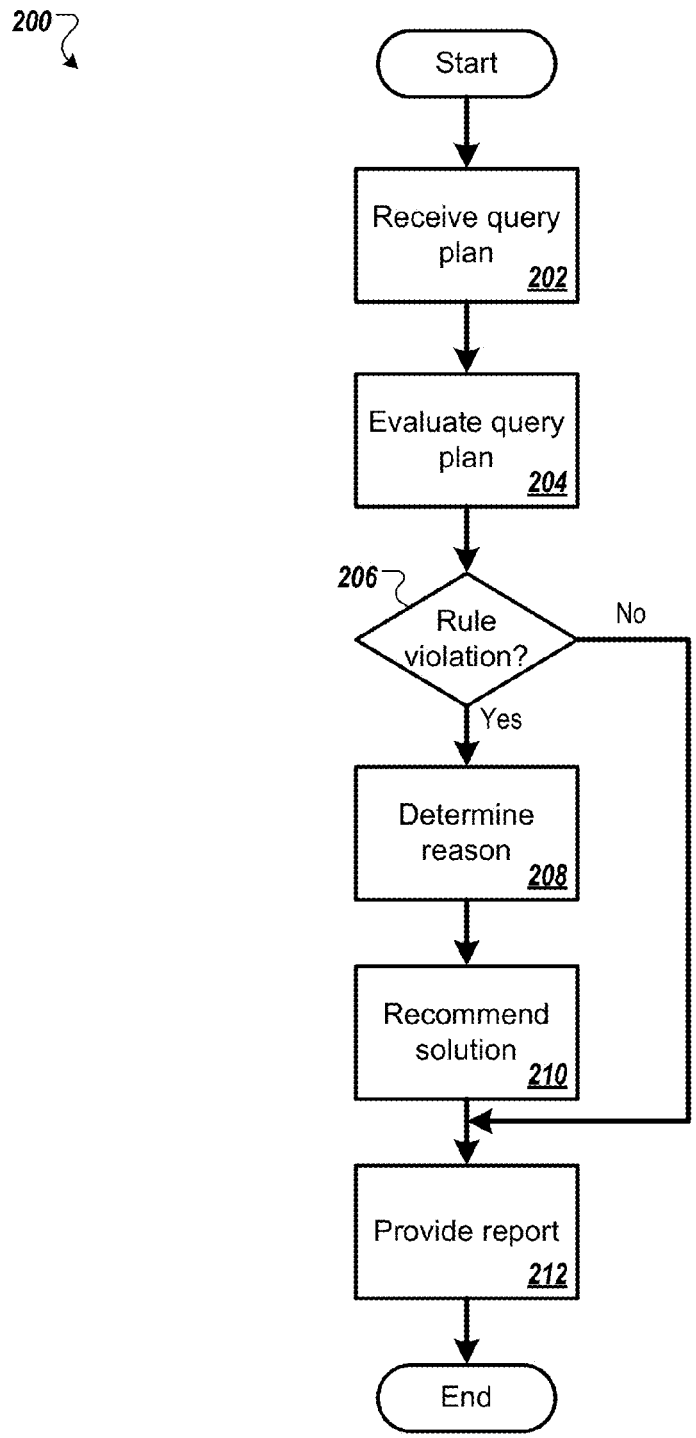
FIG. 2 is a flow diagram illustrating an example process for evaluating a query plan.

FIG. 2 is a flow diagram illustrating an example process 200 for evaluating a query plan. Briefly, the process 200 describes a method for evaluating a query plan against knowledge rules to determine rule violations, a reason for the violation and a recommended solution to avoid or correct for the rule violation. The results of the evaluation may be provided to a user in the form of a report. For example, the process 200 may be used by the query plan evaluator 112 included in the server computing system 104 described in FIG. 1.

The process 200 begins by receiving a query plan (202). For example, the server computing system 104 receives the query plan in the query_plan.xml document sent to the server computing system 104 from the client computing system 102 in state B. The query plan is evaluated (204). For example, the query plan evaluate application 108 evaluates the query plan encoded in the query plan document (e.g., query_plan.xml) received from the client computing system 102. The query plan evaluate application 108 bases the evaluation of the query plan on a set of knowledge rules included in the evaluator database 104b.

If a rule violation is determined (206), the query plan evaluate application 108 may determine a reason for the rule violation and a rating for the violation along with an overall score for the query plan (208). In some cases, the violation of a knowledge rule may result in the failure of the execution of an operation or function in the query plan. In some cases, the rule violation may result in a warning with respect to the execution of the operation or function. The rating can have an associated reason indicating the operation or function identified in the rule violation and the reason for the rule violation. For example, in FIG. 1, the query plan evaluate application 108 determines the "use of function_X with argument arg2" (language element 140a) as the reason 138a for the failure rating 136a in the information provided to the client computing device 102 for display to the user in the results table 126 on the display device 102a. The query plan evaluate application 108 determines the "use of function_X" (language element 140a) as the reason 138b for the warning rating 136b. In addition, the query plan evaluate application 108 determines the score 134 for the query plan. The user may use the score 134 as a general indication of the quality of the query plan. The user may use the score 134 in order to determine whether or not to rewrite or otherwise modify the query plan based on the ratings and associated reasons provided in the results table 126 by the server computing system 104.

Solutions are recommended (210). The articles 114 may provide the user with tips for possible solutions to the identified reasons for the indicated failures and warnings for the query plan. For example, tips 128a-b provide hyperlinks to the articles 114 that provide possible solutions to the rule violations noted in the reasons 138a-b for the ratings 136a-b, respectively, for the query plan (e.g., query_plan.xml). A report is provided (212). For example, the server computing system 104 provides the client computing system 102 with a report of the results of the evaluation of the query plan. Results table 126 may display to the user on display device 102a the results of the evaluation provided by the report.

If a rule violation is not determined (206), a report is also provided (212). For example, the server computing system 104 provides the client computing system 102 with a report of the results of the evaluation of the query plan where the query plan evaluator application 108 determines the query plan does not violate any knowledge rules. The report may include a score of "A" for the query plan. For example, the client computing system 102 may display the query plan document name (e.g., query_plan.xml) along with the score on the display device 102a.

Figure 3:
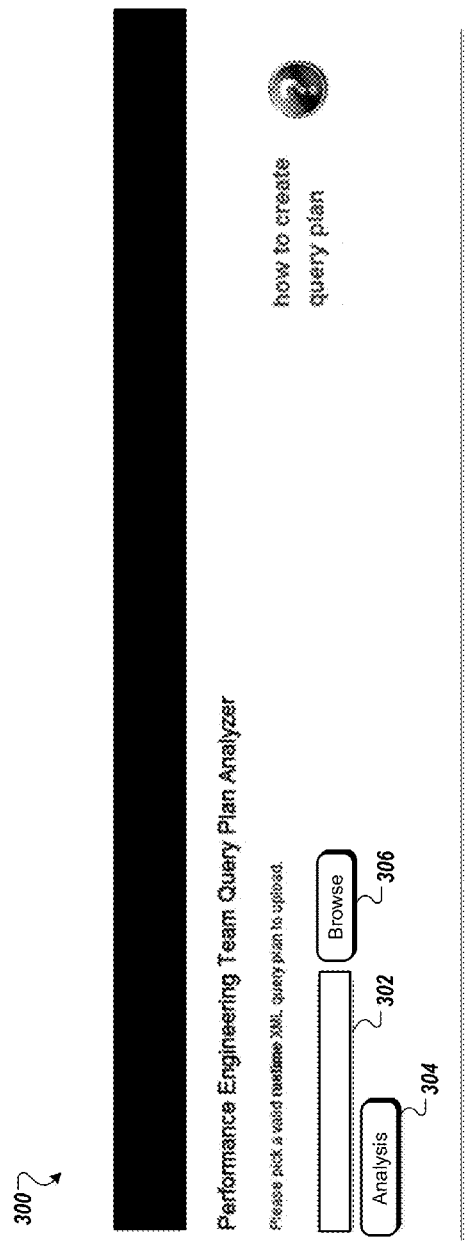
FIG. 3 is a screen shot of a home page for a query plan analyzer.

FIG. 3 is a screen shot of a home page 300 for a query plan analyzer. For example, a user of the client computing system 102 may activate the query plan application 122 that displays the home page 300 on the display device 102a. The user can enter the document name of the query plan for analysis in the entry field 302. Once the document name of the selected query plan for analysis is displayed in the entry field 302, the user can activate the analysis button 304 to begin the analysis (evaluation) of the query plan. In some cases, the user can activate the browse button 306, which displays a list of query plans for selection as shown in FIG. 4.

Figure 4:
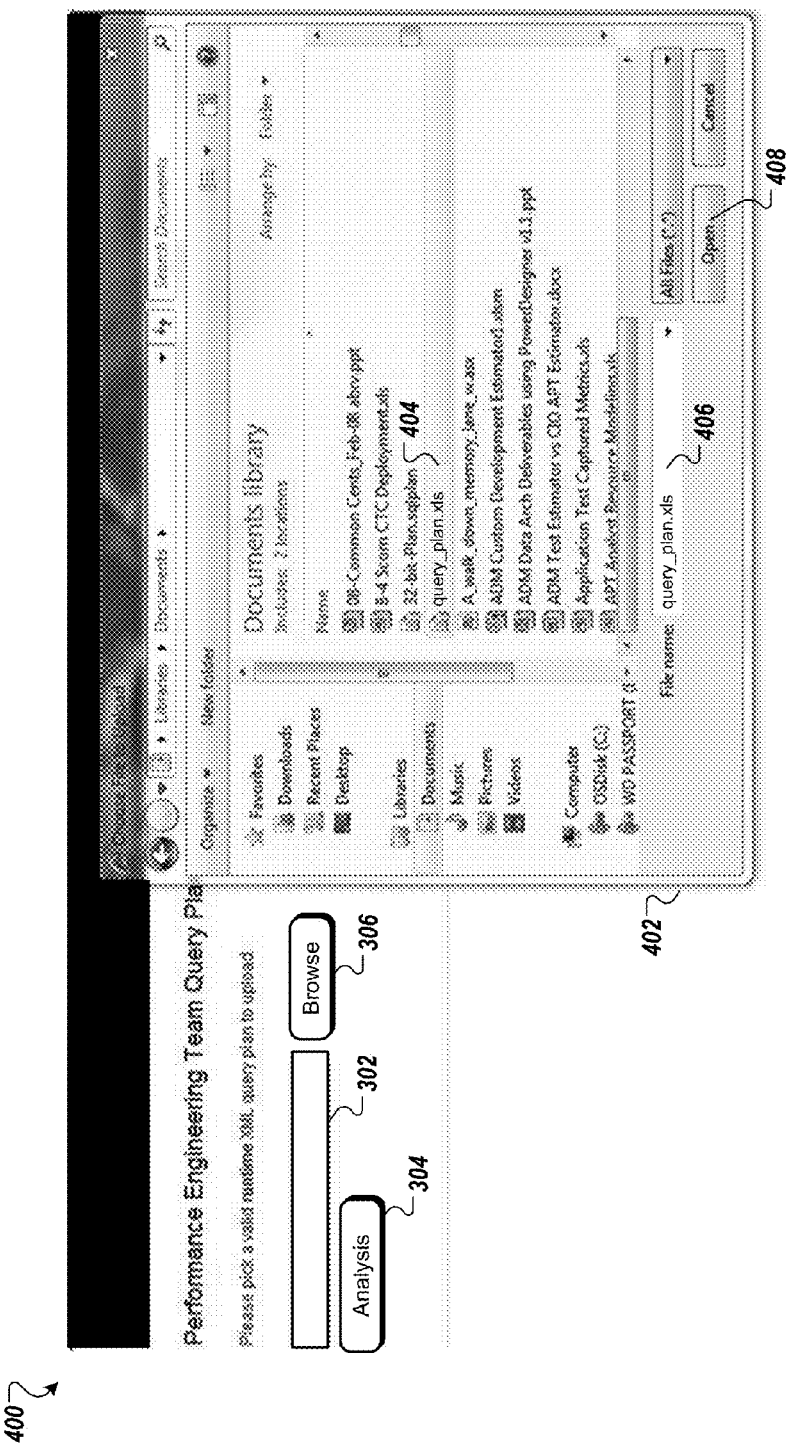
FIG. 4 is a screen shot of a document selection window superimposed on the home page in FIG. 3.

FIG. 4 is a screen shot of a document selection window 402 superimposed on the home page 300 in FIG. 3. The document selection window 402 provides the user with a user interface for selecting a query plan document (e.g., query_plan.xml) from among their stored files on the client computing system 102. The document selection window 402 is an example of the query plan list 124 displayed in a user interface on the display device 102a. In the example document selection window 402, additional documents and files stored on the client computing system 102 may also be displayed. For example, the user may use a pointing device (e.g., a mouse) to select the query plan document 404 whose file name is displayed in the file name entry field 406.

The user may activate the open button 408 to select the query plan document (e.g., query_plan.xml) for uploading to the server computing system 104 for evaluation. As described in FIG. 1, the client computing system 102 sends the query plan document from the client computing system 102 to the server computing system 104 by way of network 106.

FIG. 5 is a screen shot of a results page 500 for display on the display device 102a. For example, referring to FIG. 1, the client computing system 102 may display the results page 500 that includes the results of the evaluation of the query plan (e.g., the query plan encoded in the query_plan.xml document uploaded to the server computing system 104 from the client computing system 102) by the query plan evaluator 112. The results page 500 may include a results table 502, which is an example of the results table 126 displayed in a user interface on the display device 102a.

The results page 500 includes the query plan document name 504 and a results date 506 indicating the date on which the server computing system 104 performed the evaluation of the query plan. In addition, the results page includes an identification (ID) number 508, which may be used to identify the specific evaluation.

The results page 500 includes a status 510 indicating the status of the result of the evaluation of the query plan. In the example illustrated in FIG. 5, the query plan (e.g., query_plan.xml) failed. The results table 502 displays: a table name in a table name column 512; a rating for a database query access to the named table in a ratings column 514; the logical operation (if any) performed on the data included in the named table in a logical operation column 516; a comment regarding the database query for the named table in a comments column 518; and a hyperlink to a tip regarding a recommendation with respect to the query performed on the named table in a tips column 520.

For example, the query plan accesses a database table [RESPROJECTS] 512a. A database query to the database table [RESPROJECTS] 512a fails as indicated by a failure rating 514a. Logical operation 516a indicates that the query performed a clustered index scan on the database table [RESPROJECTS] 512a. Comments 518a indicate that an index was missing while performing the scan, which could account for the failure rating 514a. A hyperlink to a tip 520a may provide recommendations or guidance to the user in order to resolve the missing index while the query is performing a clustered index scan on the database table [RESPROJECTS].

In another example, the results table 502 displays a general warning in warning rating 514d. Comments 518d indicate that the query is performing more than six table joins. This number of table joins may be excessive and may result in the degraded performance of the database system. A hyperlink to a tip 520d may provide the user with suggestions as how to avoid the large number of table joins.

In another example, the results table 502 displays a warning in warning rating 514 for a database query to access a database table [CLIENTMASTER] 512e. Comments 518e indicate that the query is retrieving a large number of rows (1000) from the database table [CLIENTMASTER] 512e.

The comments 518e also indicate that retrieving a large number of rows may degrade the database system performance. A hyperlink to a tip 520e may provide the user with suggestions for reducing the number of row access to the table performed by the query.

In some implementations, the query plan (e.g., query_plan.xml) may include a query to retrieve a significant number (e.g., 1000) of rows of data from a database table included in the database 102c. Referring to FIG. 1, the query plan evaluate application 108 may evaluate the query plan against knowledge rules where retrieval of a predetermined large number (e.g., 1000) of rows of data from a database table violates a knowledge rule. In some cases, the query returns the requested rows of data from a database table included in the information database 104c on the server computing system 104 to the client computing system 102. An application running on the client computing system 102 can sort the returned data for display to a user in one or more pages on the display device 102a. The access, sending, receiving, sorting and displaying of the large number of requested rows of data may cause performance issues on the server 104a, throughput constraints on the network 106, and potential bottlenecks in the processors 116 included in the client device 102b. In some implementations, the application may display a small subset of the rows of data at any one time.

For example, referring to FIG. 1, the query plan evaluate application 108 may evaluate a query plan against knowledge rules (e.g., a query returning 1000 rows or more of data). The evaluation determines the query plan returns the requested rows of data from a database table. The query plan evaluate application 108 may fail the query plan for returning the large number of requested rows of data. A tip for rewriting the query plan or fixing the indicated failure may be for the query plan to query for the data needed to display to the user on a single page on the display device 102a. For example, in this case, the single page of data may include approximately 25 rows of data in comparison to the accessing, sending, receiving, and sorting of one thousand or more rows of data in order to display approximately 25 rows of data. The query plan can include functions that enable effective results paging of a result set (e.g., the one thousand or more rows of data). The effective results paging may result in the server computing system 104 not having to send the entire result set to the client computing system 102 in order for the client device 102b to sort the result set for displaying a page to the user on the display device 102a.

Figure 6B:
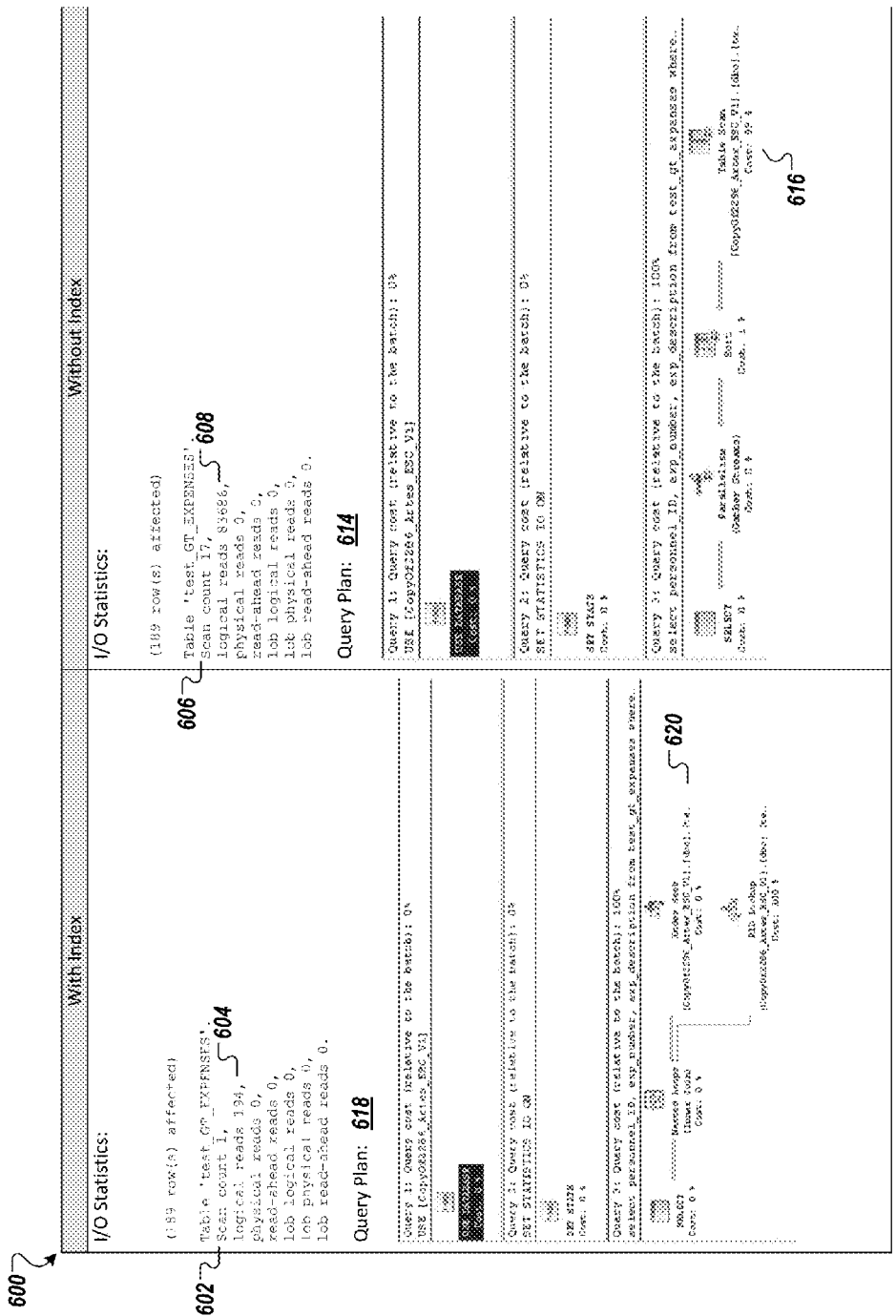
Figure 6C:
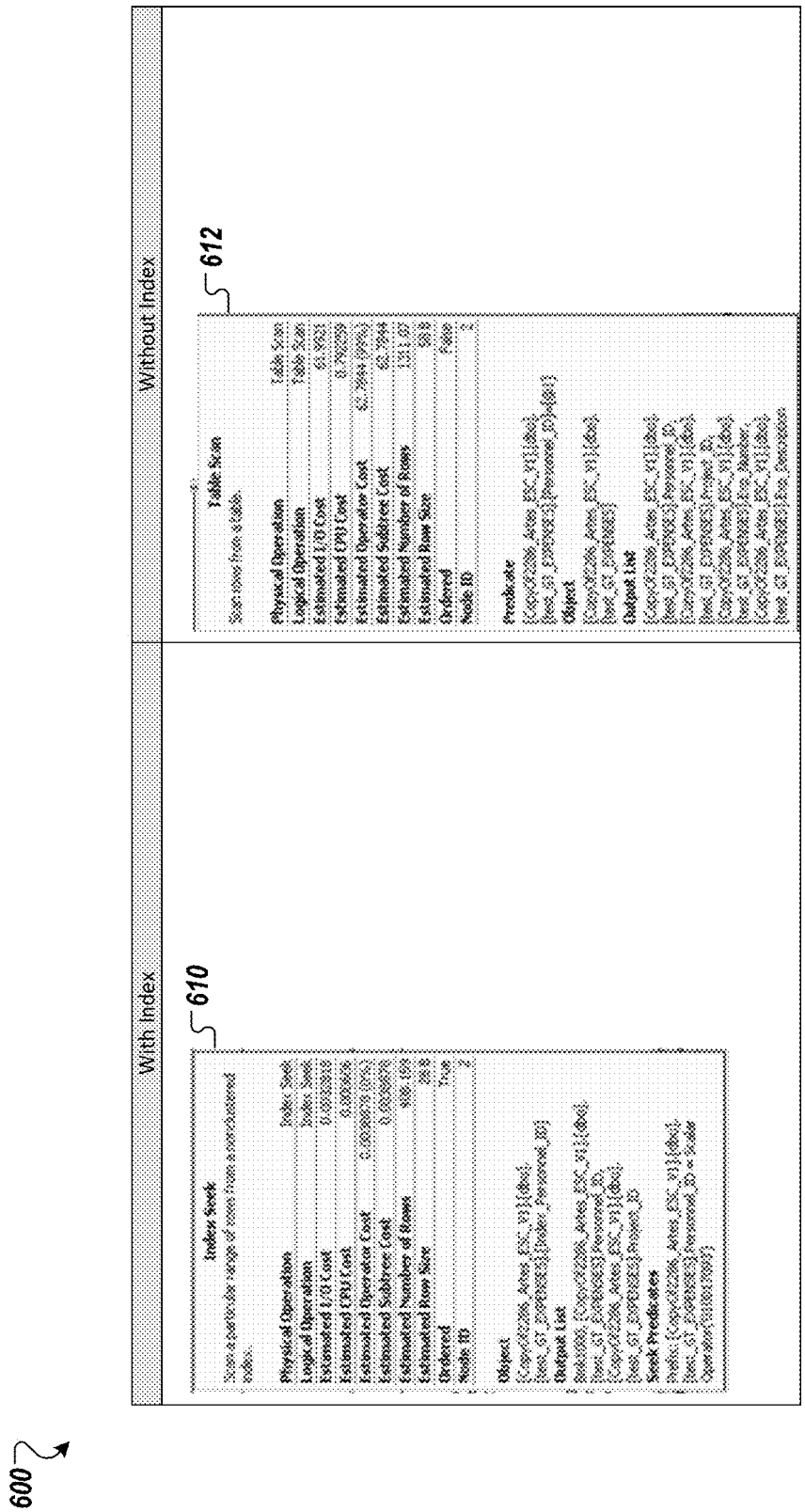

FIGS. 6A-C illustrate an example comparison table 600 showing structured query language (SQL) operations performed in order to access data in a database table. The comparison table 600 compares the SQL operations performed to access data from a database table that includes a set index (with index column 602) for the table as compared to the SQL operations performed to access data from a database table that does not include a set index (without index column 604) for the table. Additionally or alternatively, the without index column 604 can list the SQL operations performed to access data in a database table where an SQL optimizer chooses not to use an existing table index.

The server computing system 104 may run an instance of an SQL server that may execute SQL functions and commands in order to access and manage the information database 104c. In some implementations, the information database 104c may be a relational database.

For example, a query plan (e.g., query_plan.xml) may include a query to perform database table scans in order to access data from a database table. Referring to FIG. 6B, a query plan 614 includes a table scan 616. The query plan 614 indicates the table scan 616 is responsible for 99% of the query cost. Referring to FIG. 1, the query plan evaluate application 108 may evaluate the query plan 614 against knowledge rules where the use of table scans violates a knowledge rule. Query plans that include database table scans can increase the execution time for a database access as the entire database table is scanned in order to determine the data to access. The use of a table index may allow the query plan to use an index seek to access the database table in comparison to a table scan in order to access the requested data form the table. For example, query plan 618 may include an index seek 620 responsible for 0% of the query cost.

For example, using an index to access the database table may result in a single scan of the table (scan count 602) that includes 194 logical reads (number of logical reads 604). This may be compared to 17 scans (e.g., scan count 606) and 83,686 logical reads (e.g., number of logical reads 608) when an index is not used when accessing the database table.

Referring to FIG. 6C, index seek definition 610 shows a definition for a database table with a specified index. A database query may use an index seek to access the database and obtain results that may use fewer input/output and central processing unit (CPU) costs for a processor (e.g., processors 116 in FIG. 1).

Table scan definition 612 shows a definition for a database table without a specified index. A database query may use a table scan to access the database and obtain results that may use excessive input/output and central processing unit (CPU) costs for a processor (e.g., processors 116 in FIG. 1).

For example, referring to FIG. 1, the query plan evaluate application 108 may evaluate a query plan against knowledge rules (e.g., the use of a table scan). The evaluation determines the query plan uses a table scan to access a database table. The query plan evaluate application 108 may fail the query plan for using the table scan with a database table that includes over one million rows of data. A tip for rewriting the query plan or fixing the indicated failure may be to add an index on the database table in order to speed up the search and retrieval of records included in the database. In the example illustrated in FIGS. 6A-C, an index (e.g., Index_Personnel_ID) is added to the table to speed up the search and retrieval of requested information for a particular Personnel_ID index key. In addition, the Project_ID index key is included as part of the index as the data is sorted based on the Project_ID indexkey (e.g., create index 614). Query plan 618 may be presented to the user as a suggested query plan for use.

Figure 7A:
FIGS. 7A-B illustrate an example of the use of an SQL SELECT statement without and with the DISTINCT keyword, respectively.
Figure 7B:
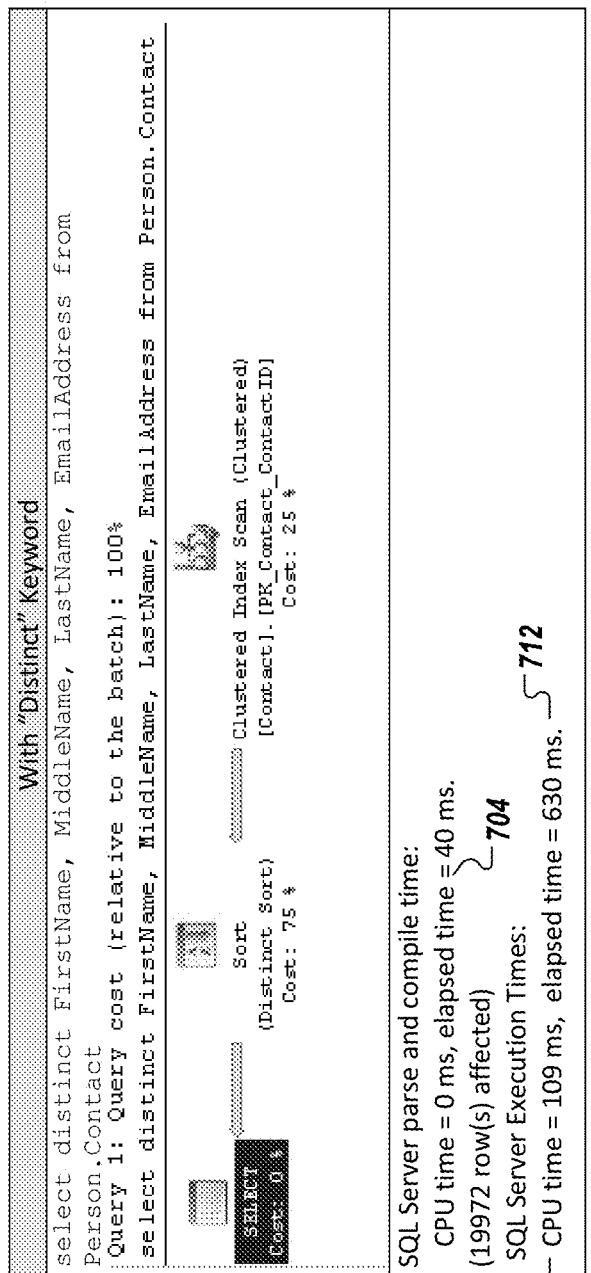

FIGS. 7A-B illustrate an example of the use of a SQL SELECT statement without and with the DISTINCT keyword, respectively. For example, a SELECT statement may use the DISTINCT keyword to remove duplicate records returned by a database query. A query plan that includes a database query that uses the DISTINCT keyword in a SELECT statement may require the use of a hash table to remove the duplicate records. A query processor included as part of an SQL server builds a hash table for each row of data (each data record) that the query processor processes in memory. As the query processor processes subsequent rows, the query processor computes the hash and compares it to the hash table for possible matches. The use of the DISTINCT keyword may cause system performance impacts due to inefficiencies with respect to the query optimizer along with added processing overhead.

In FIG. 7A, an elapsed time 702 for an SQL server parse and compile time for a query is equal to zero milliseconds (msec.) without the use of the DISTINCT keyword. In comparison, in FIG. 7B, an elapsed time 704 for the SQL server parse and compile time for the query is equal to 40 msec. with the use of the DISTINCT keyword. In FIG. 7A for an SQL server execution time for a query, a CPU time 706 is equal to 63 msec. and an elapsed time 708 is equal to 534 msec. without the use of the DISTINCT keyword. In comparison, in FIG. 7B, for the SQL server execution time for the query, a CPU time 710 is equal to 109 msec. and an elapsed time 712 is equal to 630 msec. with the use of the DISTINCT keyword. The comparison shows an approximately 40% increase in CPU time for a query with the use of the DISTINCT keyword as compared to a SELECT statement that does not use the DISTINCT keyword. The use of the DISTINCT keyword increases the workload for the SQL server.

For example, referring to FIG. 1, the query plan evaluate application 108 may evaluate a query plan against knowledge rules (e.g., the use of the DISTINCT keyword in a SELECT statement). The evaluation determines the query plan uses the DISTINCT keyword in a SELECT statement. The query plan evaluate application 108 may provide a warning for the query plan for the use of the DISTINCT keyword. In some cases, the use of the DISTINCT keyword may be justified. A tip, for rewriting or modifying the query plan for the use of the DISTINCT keyword, may be to check one or more factors when using the DISTINCT keyword. For example, the use of a distinct aggregation function (e.g., SELECT COUNT (DISTINCT . . . )) should be avoided. Duplicate result sets (records) may be the result of a poor database design and/or an ineffective query. A user may modify the query plan and the database design to provide more efficient performance results. Applying the DISTINCT keyword clause to an already unique row (a row that is not a duplicate row) is not needed as a unique index may remove the sort state as the index indicates to the SQL optimizer that the row is already unique.

A tip may provide advice to the user to determine why there are duplicate row results returned from the database query as opposed to fixing the return of the duplicate row results by including the DISTINCT keyword in the query. The user may review the query logic by breaking down the requirements for the results in order to build the query on a piece-by-piece basis using the requirements. A tip may be to know how to join primary keys to foreign keys, in particular in cases that include composite keys.

FIGS. 8A-F illustrate an example of the use of implicit conversions. For example, referring to FIG. 1, a query processor included in as part of an SQL server may add implicit data conversions where columns, variables and/or parameters with different yet compatible data types are used in a single expression in a database query. In some implementations, the use of implicit data type conversions may negatively affect system performance. For example, the use of a "convert_implicit" directive in the predicate of a query plan may indicate a performance issue related to a query in the query plan. The query may use an index scan as opposed to an index seek for a database query. In order to perform an index seek, the SQL server includes key values that match the data type stored in the index for use in the index seek. The SQL server may not perform an index seek on a column with a data type different from the data type of the index. The SQL server converts (e.g., uses the convert_implicit directive) the column data type to a different yet compatible data type (e.g., a conversion from a "real" to an "int") for use with the index.

For example, a query using an equal operator on a column of a primary key for a table may exhibit poor performance. The query plan indicated the query used an index scan. The use of an index seek can improve the query performance.

FIG. 8A illustrates a database definition table 800. The database definition table 800 includes a row for each column included in a database table 836 (e.g., GT_Expenses table). Each row includes a database column name that is an index key (e.g., index key 834 (e.g., Personnel_ID)). FIG. 8B illustrates a database index table 802. The database index table 802 includes a row for each index provided for the database table 836. For example, an index 804 (e.g., Index_Personnal_ID) is provided for the index key 834 (e.g., Personnel_ID). Executing a database query can include seeking to the location of the index 804 and performing a lookup to obtain one or more table rows. Referring to FIG. 8C, using implicit conversion of the index 804 (resulting in an index value 806) when performing the query, results in the performing of 17 scans (scan count 808) and 30,545 logical reads (logical read count 814) of the database table 836 in order to obtain the requested one or more table rows. For example, for a database table that includes millions of rows, a query can take an excessive amount of time (e.g., several seconds). Without the implicit conversion of the index 804 (resulting in an index value 810), the query performs a single scan (scan count 812) and 1,153 logical reads (logical read count 816). In some implementations, the preferred scan count may be zero. The lower scan count and fewer logical reads without the use of implicit conversion is due to the use of an index seek scan. The index seek scan searches a particular range of rows using a non-clustered index (e.g., index 804). In this case, the logical read count 816 is consistent with the expected logical read count for a table that includes millions of rows.

Figure 8D:
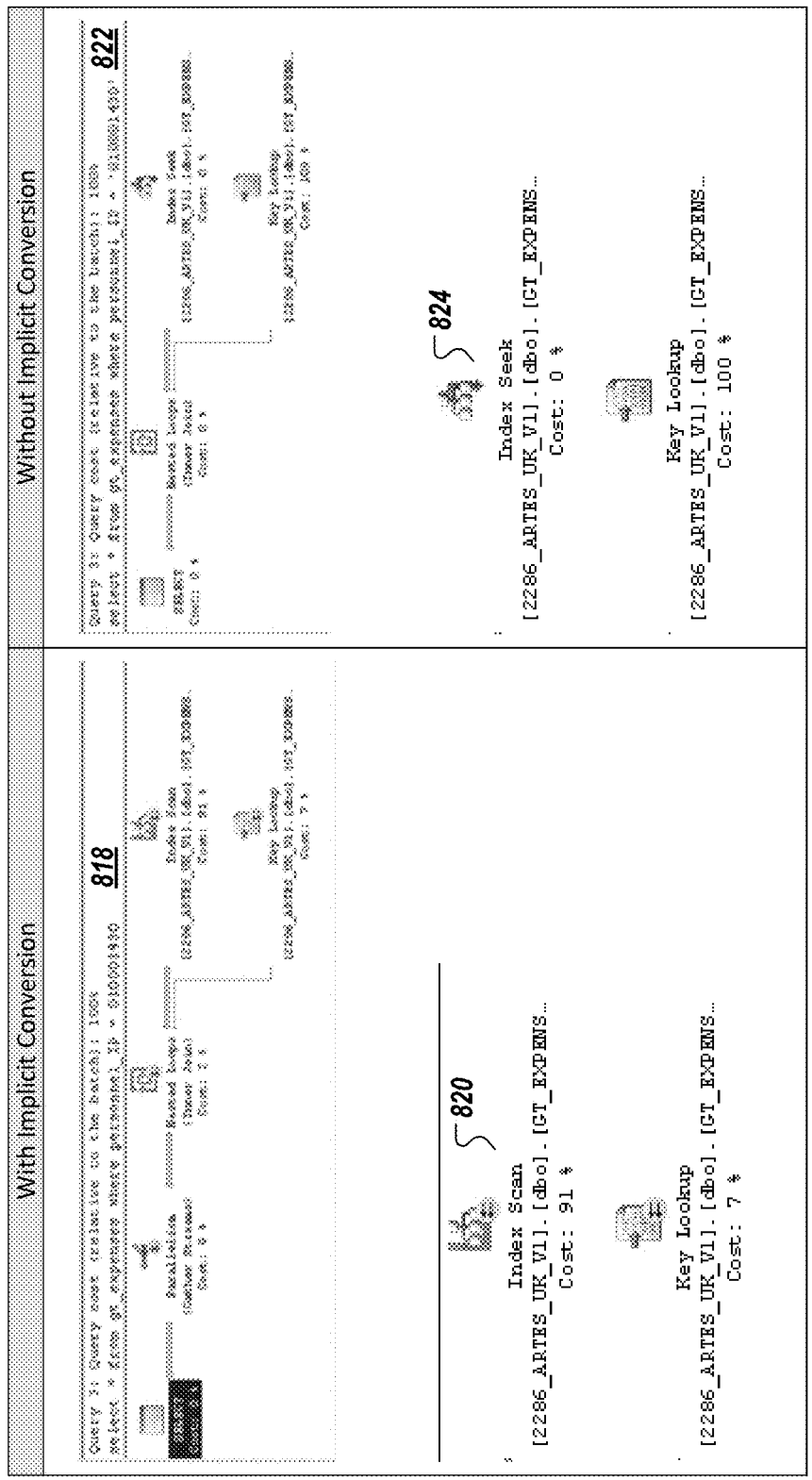
Figure 8E:
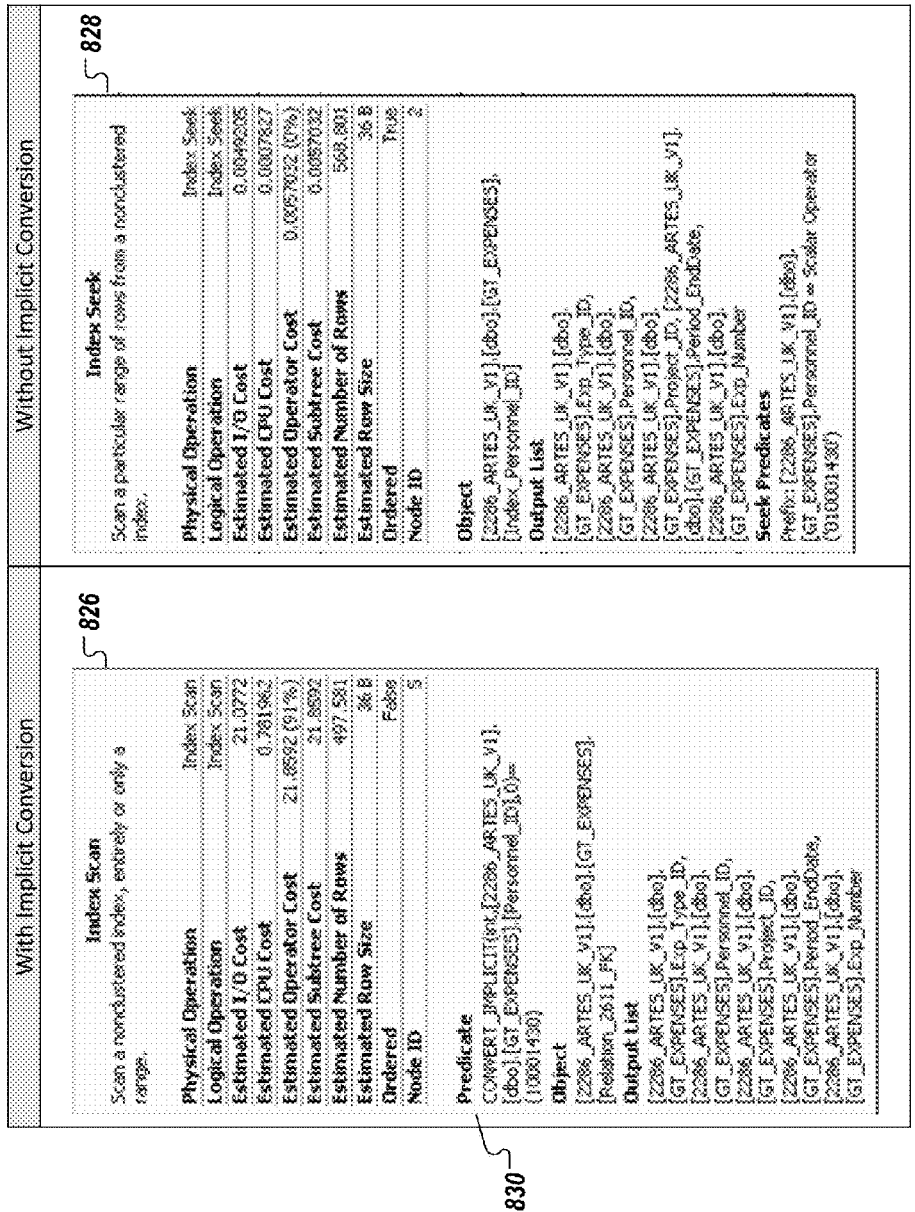

FIG. 8D illustrates a query plan 818 that includes an index scan 820 and query plan 822 that includes an index seek 824. FIG. 8E illustrates index scan definition 826 and index seek definition 828. The index scan definition 826 shows a convert_implicit function call 830 included in a predicate 832 for a query plan where the convert_implicit function call 830 modifies the index key 834 (e.g., Personnel_ID) before comparing the index key 834 to the index value 806 used for the query. As shown in table 800 in FIG. 8A, the index key 834 is declared to be of type "char" with a length of nine. Once the function call 830 is executed, the implicit conversion of the index key 834 is performed in order to complete the index san of the database table 836. In contrast, the index seek 824 does not perform a convert_implicit function call. The index seek 824 performs a table seek using the index 804. The estimated costs for the index seek definition 828 are lower than the estimated costs for the index scan definition 826. The use of the index seek definition 828 may be considered a preferred database query option.

For example, referring to FIG. 1, the query plan evaluate application 108 may evaluate a query plan against knowledge rules (e.g., the use of an index scan verses the use of an index seek and the use of implicit conversions). The evaluation determines the query plan uses an index scan when a single column (e.g., the Personnel_ID column with index key 834) is the index column (e.g., the index 804 (e.g., Index_Personnal_ID) for the index key 834 (e.g., Personnel_ID)). The query plan evaluate application 108 may provide a warning indicating the use of the index scan and the occurrence of the implicit conversion. A tip may provide the user with a query plan modification to resolve the index scan and implicit conversion issues. For example, the tip can suggest to the user to change the database query to compare the index key 834 to a string constant. This change then matches the data type of the index key 834 (e.g., char of length nine) to the data type of the string.

Figure 8F:
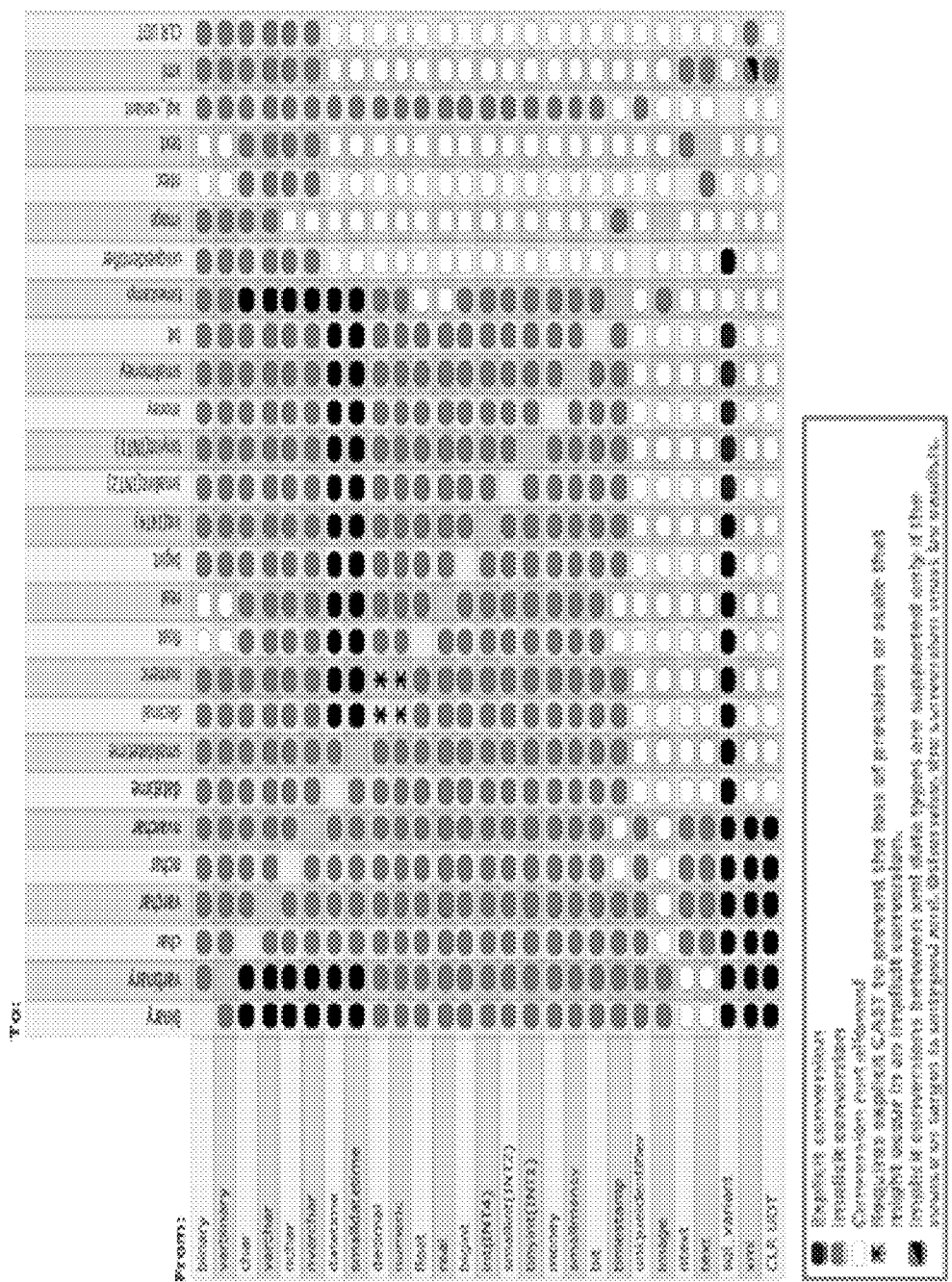

FIG. 8F is a conversion table 850 indicating the type (if allowed) of conversion performed when columns, variables and/or parameters with different yet compatible data types are used in a single expression in a database query.

Figure 9C:
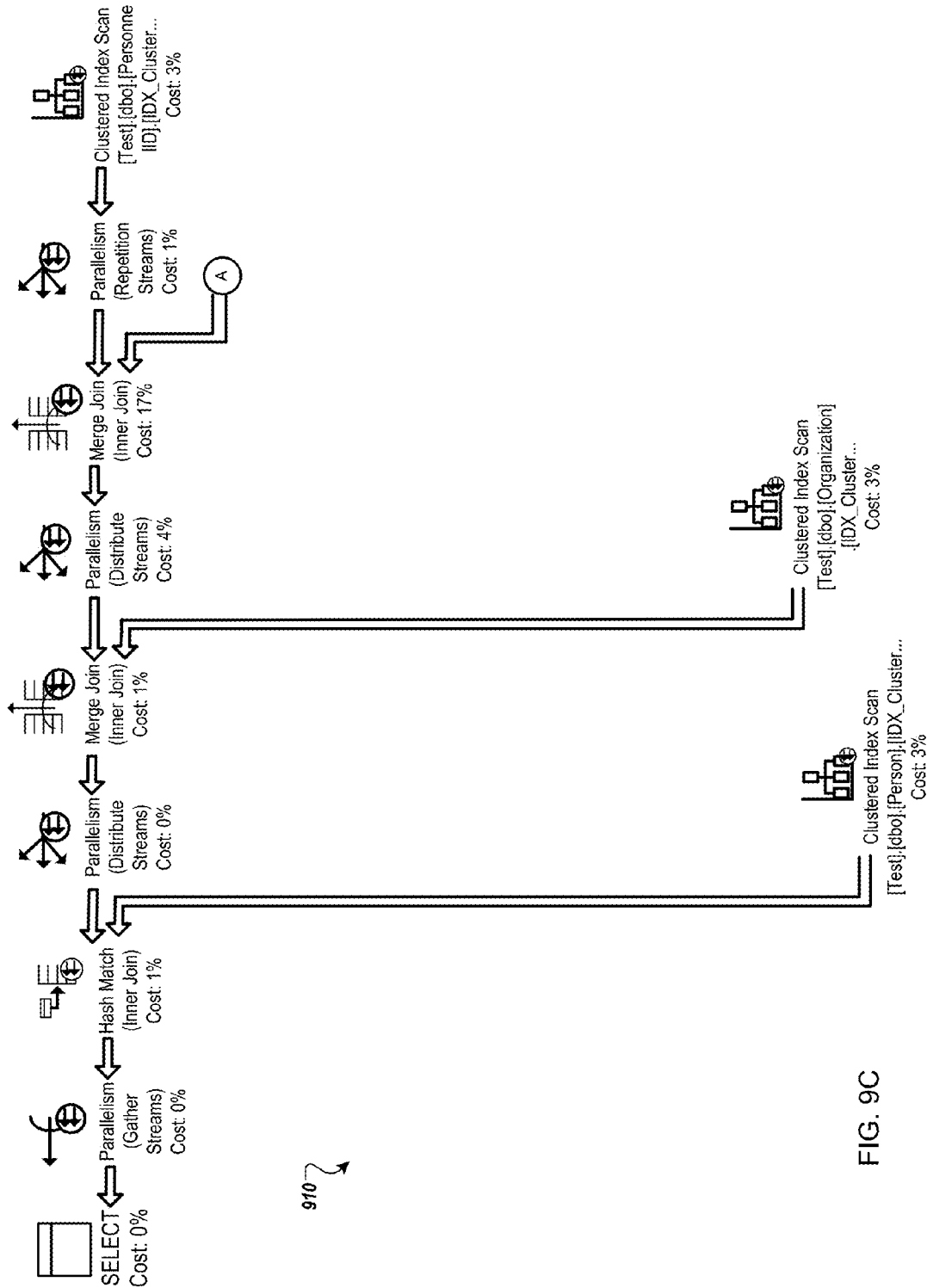

FIGS. 9A-E illustrate an example of the use of table joins. Referring to FIG. 9A, a comparison table 900 shows a query that uses excessive table joins (column 902) in comparison to a query that uses a minimum of table joins (column 904). As applications and the data they use evolve over time, a customer relationship management module (e.g., CRM module 118 in FIG. 1) may need to gather and piece together data for a single data record from multiple database tables. For example, an application that manages personnel data may include, over time, additional data for each person in the database such as additional phone numbers (e.g., cell phone numbers) and electronic (email) addresses. The personnel information may be included in records in multiple tables that can be "joined" when the application accesses the personnel data.

For example, a query plan includes query language statements that may use a large number of table joins in order to obtain a record set requested by a database query. The use of a large number of table joins to implement the database query in order to satisfy the request for the record set may increase the amount of input/output (I/O) resources, CPU cycles and memory needed to process the database query. For example, referring to FIG. 1, both the client computing system 102 and the server computing system 104 may be used to process the database query and provide the record set to a user (e.g., for display on display device 102a).

FIG. 9B shows the I/O statistics 906, 908 for the query that uses excessive table joins (column 902) in comparison to a query that uses a minimum of table joins (column 904), respectively. For example, I/O statistics 906 indicate a total number of logical reads performed by the query to be equal to 47,455 (the sum of the number of logical reads for each table accessed). In addition, the I/O statistics 906 indicate a total number of physical reads performed by the query to be equal to 788 (the sum of the number of physical reads for each table accessed). In contrast, the I/O statistics 908 indicate that the query that uses a minimum of table joins (column 904) performs fewer logical and physical reads as the query accesses fewer tables in order to provide the requested record data to the user. For example, the I/O statistics 908 indicate a total number of logical reads performed by the query to be equal to 36,118 (the sum of the number of logical reads for each table accessed). In addition, the I/O statistics 908 indicate a total number of physical reads performed by the query to be equal to 25 (the sum of the number of physical reads for each table accessed).

Figure 9D:
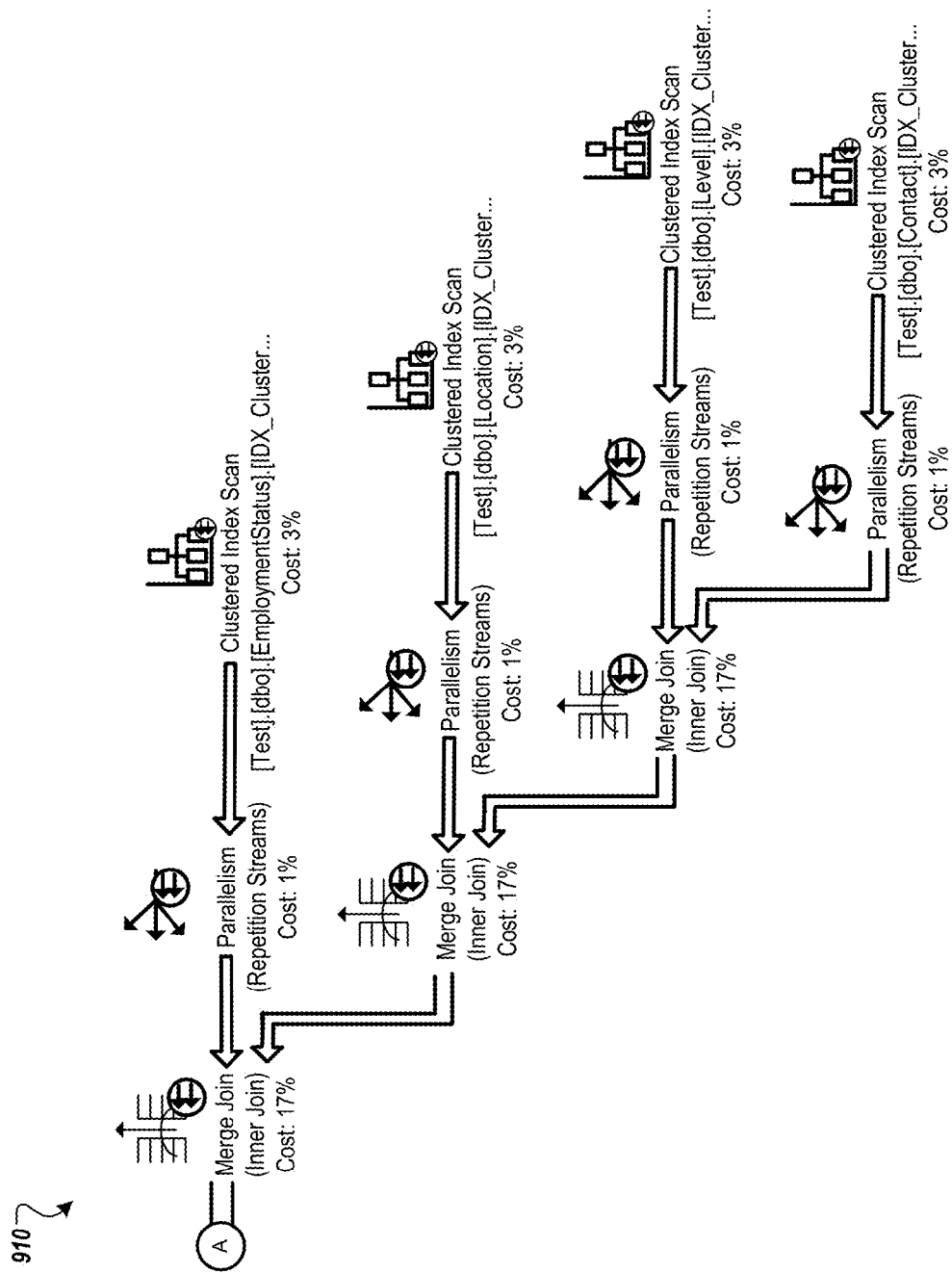

FIGS. 9C and 9D illustrate a query plan 910 that uses excessive table joins with FIG. 9D providing the continuation of the query plan 910 shown in FIG. 9C. In order to optimize the query plan 910, a query optimizer may use a hash match (or inner join) to generate the data record requested by the user. An inner join is completed in two phases and may be a resource intensive operation. A first phase of the inner join is a build phase. The build phase builds a hash table in memory, for example, included in the server computing system 104. The hash table includes joined columns for placing the requested record data. A second phase of the inner join is a probe phase. The probe phase processes a query one row at a time looking for a match between the accessed table and the joined columns in the hash table. If a match occurs, the data is moved from the accessed table to the joined columns in the hash table. The number and size of the joined tables can influence the query response time and the use of system resources. The larger the number of joined tables and the larger the join table, the longer the query response time will be. Therefore, the use of fewer table joins and the joining of smaller tables can reduce the query response time.

Figure 9E:
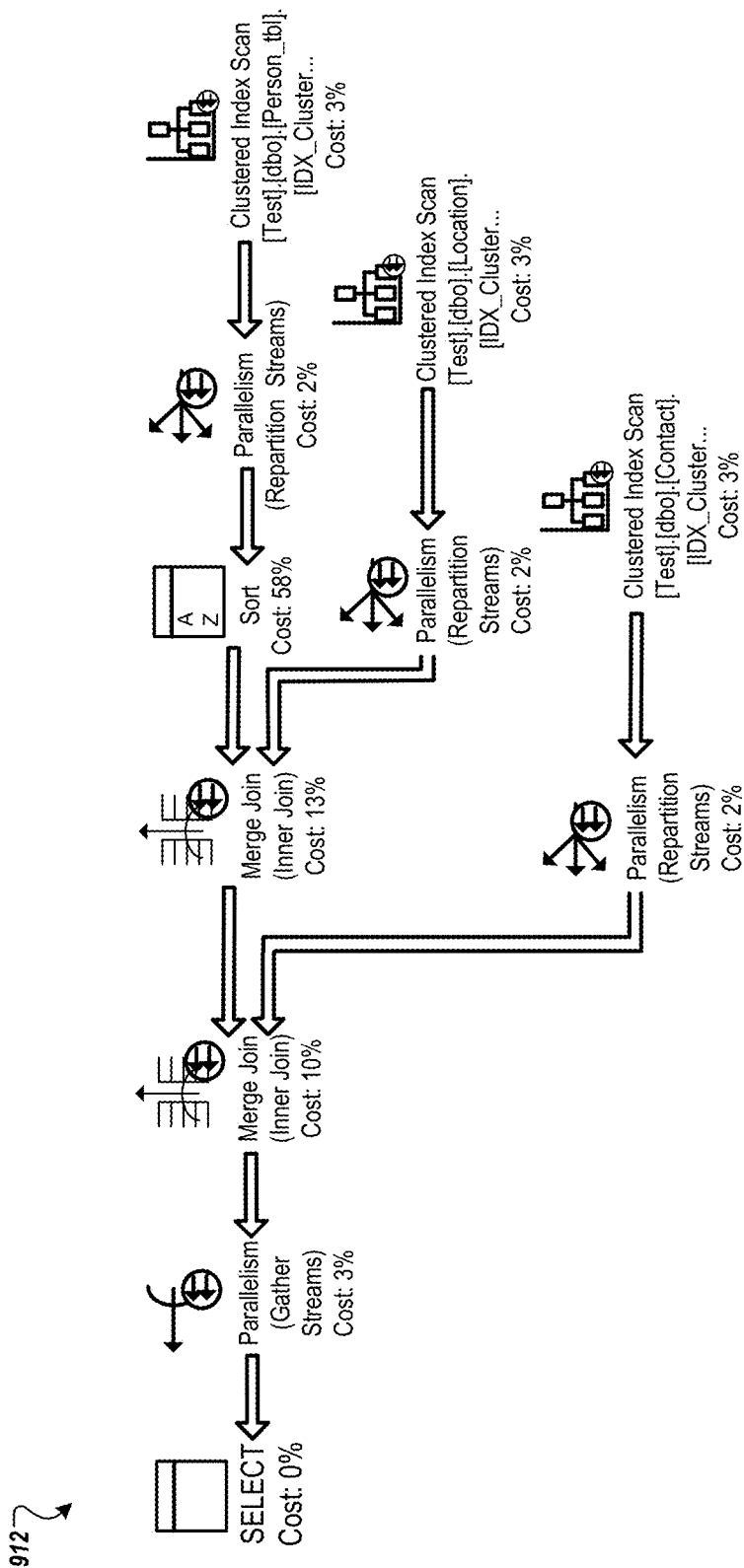

FIG. 9E illustrates a query plan 912 that uses a minimum of table joins. In order to optimize the query plan 910, a query optimizer may use a merge join to generate the data record requested by the user. A merge join may be used when the input columns to the join are sorted on the column that is being joined. Since each of the accessed tables is sorted on the same column, the database query may make a single pass through each table merging the data for the requested data record.

For example, referring to FIG. 1, the query plan evaluate application 108 may evaluate a query plan against knowledge rules (e.g., the use of an excessive number (e.g., 10) of table joins). The evaluation determines the query plan uses an excessive number of table joins based on the I/O statistics 908 for the query plan. The query plan evaluate application 108 may provide a warning indicating the use of an excessive number of table joins. A tip may be a suggestion to the user to review their query plan to determine if the requested record provides the required information needed using as few data sources as possible. For example, if data record requests in a query plan are continually adding new data sources to the query, the tip may suggest to the user to review their current data model for possible changes.

FIGS. 10A-H illustrate an example of the use of outer joins. An outer join operation may generate a data record requested by a user. In some implementations, an outer join operation returns the same rows returned by an inner join operation (described with reference to FIGS. 9A-E) and, in addition, may return rows from one table that do not match rows in another table. The query optimizer handles the optimization of outer joins differently than the optimization of inner joins. For example, the query optimizer may not rearrange the order of the outer join tables as it does for the inner join tables. An outer table (e.g., a left table in a left outer join and a right table in a right outer join) may be accessed first, followed by an inner table, resulting in a fixed join order for the accessed tables. In some cases, the fixed join order may result in less than optimal query plans. For example, a less than optimal query plan can occur when matching tables do not include properly define indexes, and when matching tables include one or more NULL values.

Figure 10C:
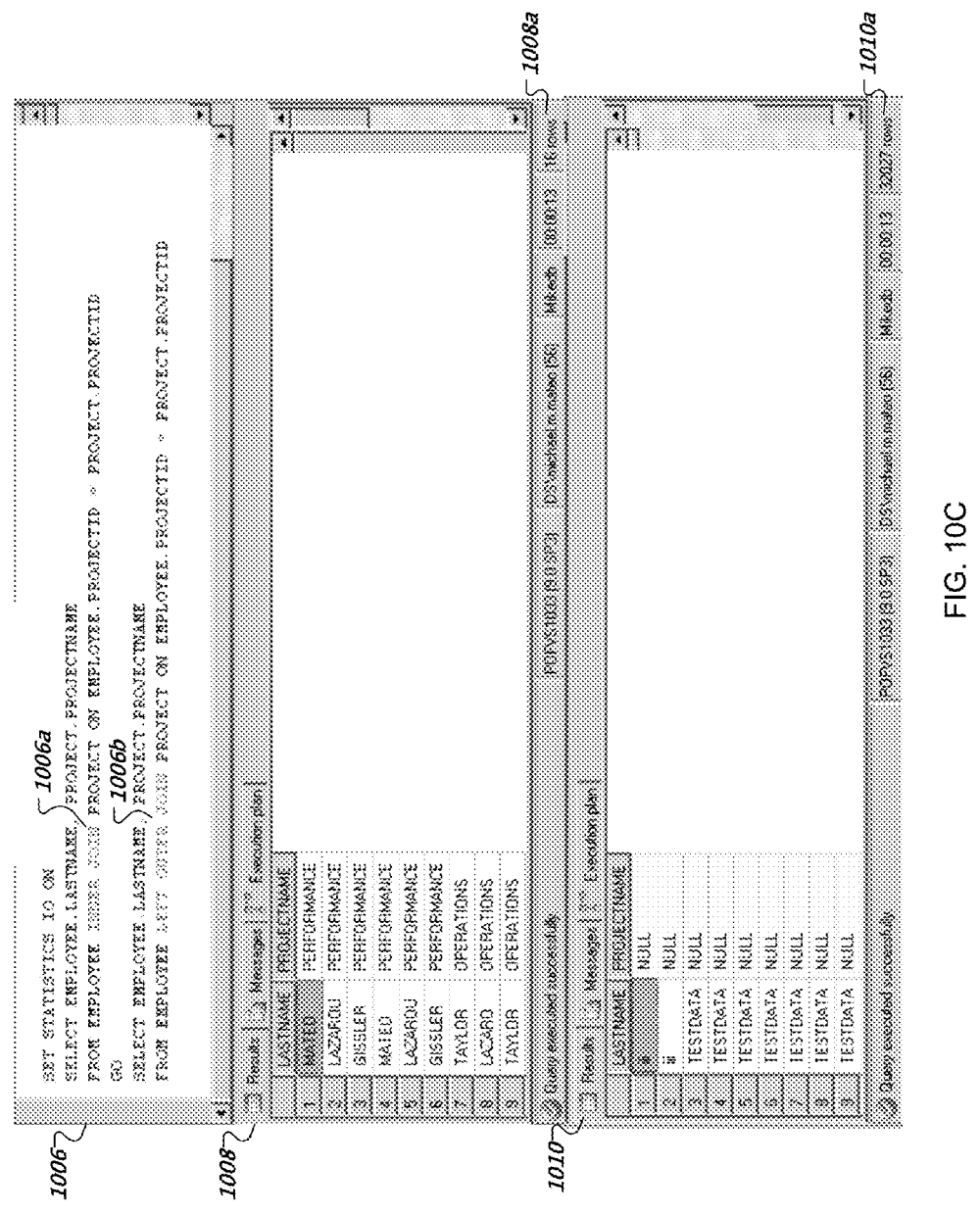

FIG. 10A shows the table properties for an employee table 1002. FIG. 10B shows the table properties for a project table 1004. FIG. 10C shows a query plan 1006 where a query uses an inner join operation 1006a and a left outer join operation 1006b for joining rows included in the employee table 1002 and the project table 1004 in order to produce a data record requested by a user and specified in the query plan 1006. In addition, FIG. 10C shows the results 1008 of the execution of the inner join operation 1006a and the results 1010 of the execution of the left outer join operation 1006b. The use of the inner join operation 1006a returns 16 matching rows (row result 1008a). The use of the left outer join operation 1006b returns 32,027 matching rows. The left outer join operation 1006b returns all rows from the left table (e.g., employee table 1002). In addition, the left outer join operation appends to the returned rows the matching rows from the left table (e.g., employee table 1002) and the right table (e.g., project table 1004). The left outer join operation 1006b may result in a high input/output cost to the system (e.g., the server computing system 104 in FIG. 1).

Figure 10D:
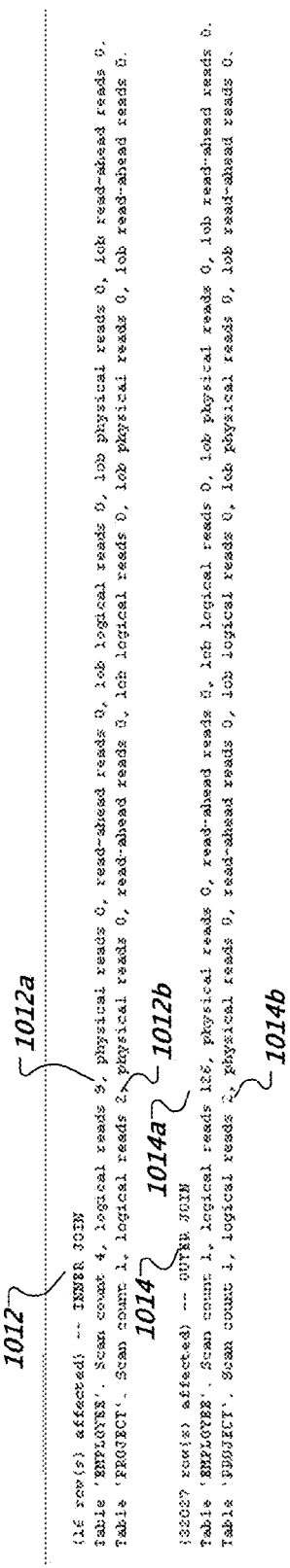

FIG. 10D shows I/O statistics 1012, 1014 for the inner join operation 1006a and the left outer join operation 1006b, respectively. For example, the inner join operation 1006a performs nine logical reads (logical read count 1012a) and two logical reads (logical read count 1012b) of the employee table 1002 and the project table 1004, respectively. In comparison, the left outer join operation 1006b performs 126 logical reads (logical read count 1014a) and two logical reads (logical read count 1014b) of the employee table 1002 and the project table 1004, respectively. In some implementations, the number of logical reads may vary as the number of matching records increases.

Figure 10E:
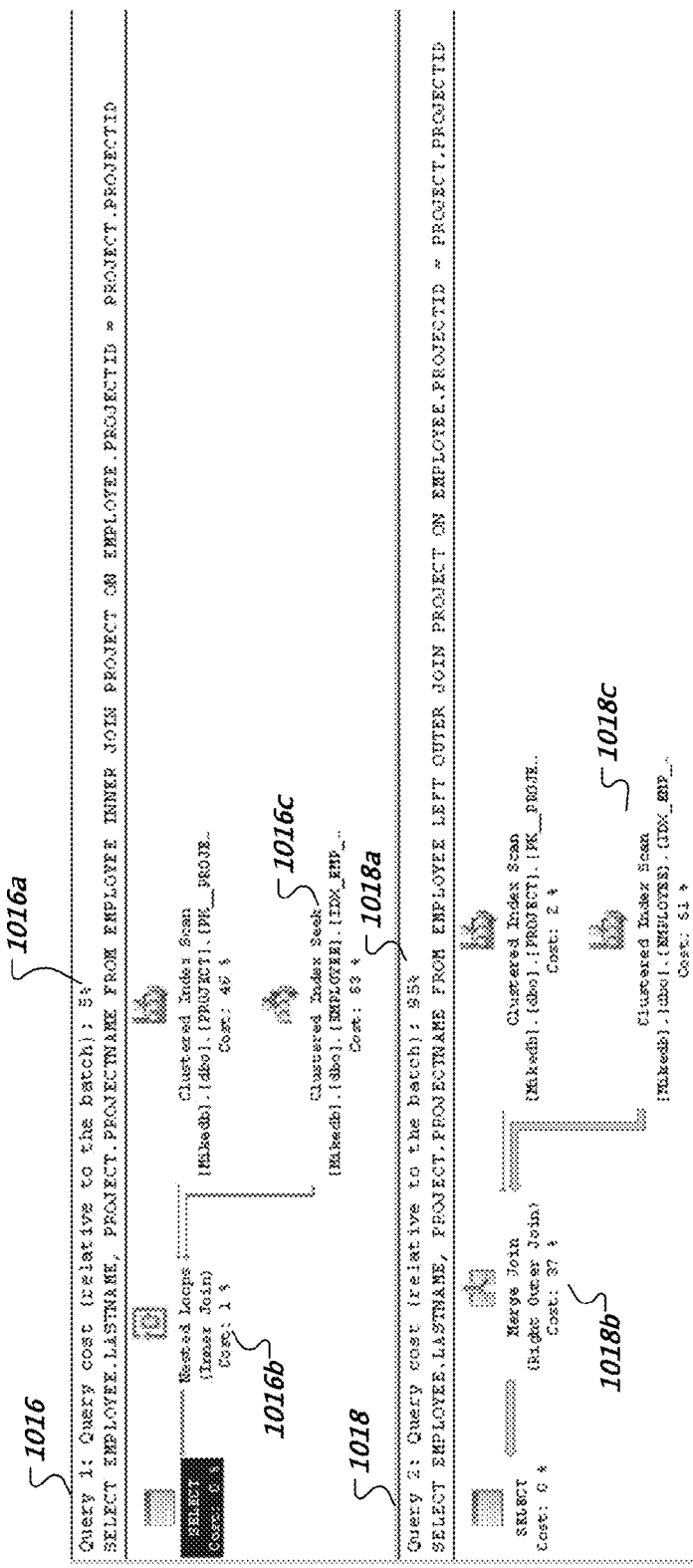

FIG. 10E shows an inner join query plan 1016 that when implemented executes the inner join operation 1006a and an outer join query plan 1018 that when implemented executes the left outer join operation 1006b. For example, an inner join query cost 1016a (relative to the batch) for the inner join query plan 1016 is five percent compared to an outer join query cost 1018a (relative to the batch) for the outer join query plan 1018 that is 95 percent. A nested loops query cost 1016b for the inner join query plan 1016 is one percent compared to a merge join query cost 1018b for the outer join query plan 1018 that is 37 percent. In addition, the inner join query plan 1016 included the use of an index seek resulting in an index seek cost 1016c of 53 percent compared to use of an index scan by the outer join query plan 1018 resulting in an index scan cost 1018c of 61 percent. As described with reference to FIGS. 8A-F, an index scan may utilize more system resources than an index seek.

In some implementations, the use of outer joins on aggregate functions, especially on tables that include NULL values, may significantly affect the query result. FIG. 10F shows a query plan 1020 that when implemented uses a right outer join operation 1020a on tables T1 and T2. The use of the right outer join operation 1020a may result in the return of ambiguous and inaccurate data.

For example, the query plan 1020 uses a database table (table T2) that includes an account column. The query plan 1020 uses aggregate functions on the account column of the database table. The account functions can include, but are not limited to a sum function, a count function and an avg (averaging) function. The query plan 1020 performs a right outer join operation 1020a on tables T1 and T2. For example, the first row 1023 of a T1 ID column 1022 indicates 10,488 rows (row count field 1023b) in the resultant joined table T1, many of which contain NULL values. The row count field 1023b indicates the correct number of rows in the joined T1 table. However, a total amount of rows (888) in a total row count field 1023a indicates the number of non-NULL value rows. In addition, an average amount of rows (888) in an average row count field 1023d indicates the number of non-NULL value rows.

Figures 10G, 10H:

FIG. 10G shows I/O statistics 1024 for the right outer join operation 1020a performed on tables T1 and T2. The I/O statistics indicate 66 logical reads (logical read count 1024a) for table T1 and 95 logical reads (logical read count 10124b) for table T2.

FIG. 10H shows a query plan 1026 that when implemented executes the right outer join operation 1020a on tables T1 and T2. An outer join 1026a (a merge join) results in a 13 percent cost.

For example, referring to FIG. 1, the query plan evaluate application 108 may evaluate a query plan against knowledge rules (e.g., the use of outer joins). The evaluation determines the query plan uses one or more outer joins (e.g., a left outer join and/or a right outer join). The query plan evaluate application 108 may provide a warning indicating the use of one or more outer joins. A tip may be a suggestion to the user to review their query plan to determine the implications of NULL values included in tables used by the outer join operations. In addition, the tip may suggest to the user to avoid the use of outer joins as they may require more system resources and I/O than the use of an inner join. In addition, an outer join may return ambiguous and inaccurate data. The tip may also remind the user that the SQL server, when implementing an outer join, will return rows for each record in the left table even if there are no matching rows between the left table and the right table. In addition, if there is not a matching row in the left table, the column for the right table will include a NULL value. An outer join can be used if, when the results of the query are reported, NULL values are also accounted for and reported.

Figure 11C:
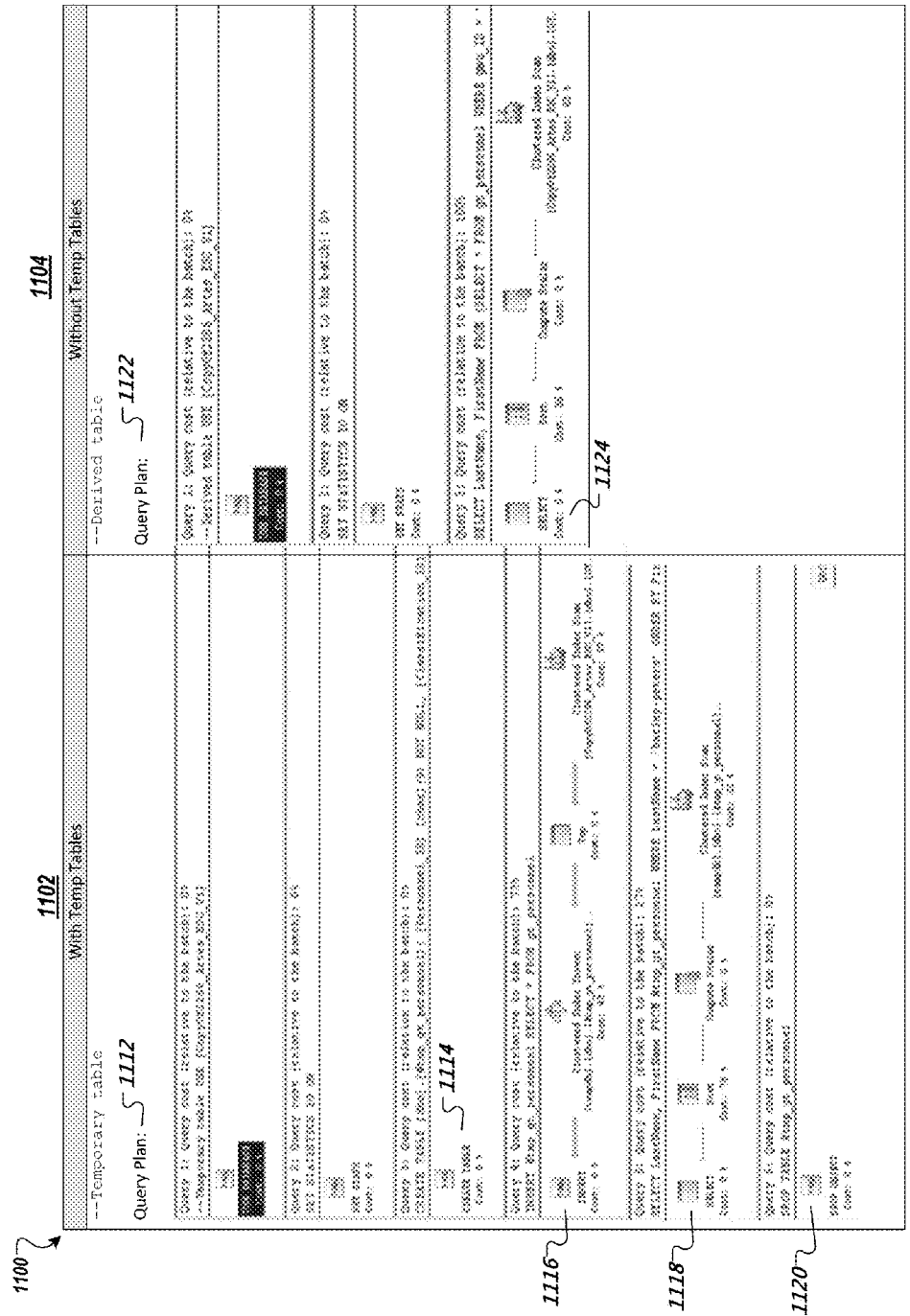

FIGS. 11A-D illustrate an example of the use of temporary tables versus derived tables with database queries. Referring to FIG. 11A, an example comparison table 1100 shows SQL operations performed in order to use temporary or derived tables. For example, temporary tables may be included in a tempdb system database. The tempdb system database may be available to users connected to the instance of the SQL server. Temporary tables included in the tempdb system database may cause performance issues. The performance issue may include the locking of the tempdb database while the temporary table is created, the I/O activity involved during the use of the temporary table and the potential locking of the tempdb system database if a transaction is used for the creation of and the subsequent operations against the temporary table.

The comparison table 1100 compares the SQL operations performed to create and use temporary tables (temp table column 1102) with SQL operations performed to create and use derived tables (derived table column 1104). The use of temporary tables may require a query plan that includes the multiple steps needed for the implementation of the temporary table for use in a query. The steps can include the functions and operations needed to create the temporary table, to populate the temporary table with data, to select data from the temporary table and to cleanup or remove the temporary table. In comparison, when using derived tables (no temporary tables), an SQL server can provide the ability to create derived tables and to use the derived tables within a query included in a query plan. The SQL server may create and use the derived tables in a single step as compared to the multiple steps needed for the implementation and use of a temporary table. Referring to FIG. 11B, the temp table column 1102 lists the SQL operations used to create and use a temporary table. The derived table column 1104 lists the SQL operations used to create and use a derived table. The result set of requested data for the query is obtained from the derived table as a table (the SELECT statement in the FROM clause 1106). A select operation is performed on the derived table in order to return the requested results without the use of a temporary table.

FIG. 11B shows the I/O statistics 1108, 1110 for the query that uses temporary tables (column 1102) in comparison to a query that uses derived tables (column 1104), respectively. The I/O statistics 1108 show the costs for each of the steps needed to implement a temporary table. The I/O statistics 1110 show the costs for the single step needed to implement a derived table.

FIG. 11C illustrates a query plan 1112 that implements and uses a temporary table. The query plan 1112 shows the multiple steps needed to implement the temporary table that include creating the table (query step 1114), populating the table with data (query step 1116), selecting data from the temporary table (query step 1118) and the removal of the table (query step 1120). FIG. 11C also illustrates a query plan 1122 that implements and uses a derived table. The query plan 1122 shows the single query step 1124 needed to implement the derived table.

In some implementations, six steps may be used when interacting with a temporary table. The six steps are: locking the tempdb database; creating the temporary table; selecting data and inserting data; selecting data from the temporary table and one or more permanent tables; dropping the table; and releasing the lock on the tempdb database. In comparison, in some implementations, three steps may be used when interacting with a derived table. The three steps are: creating one or more locks; selecting data; and releasing the one or more locks.

Figure 11D:
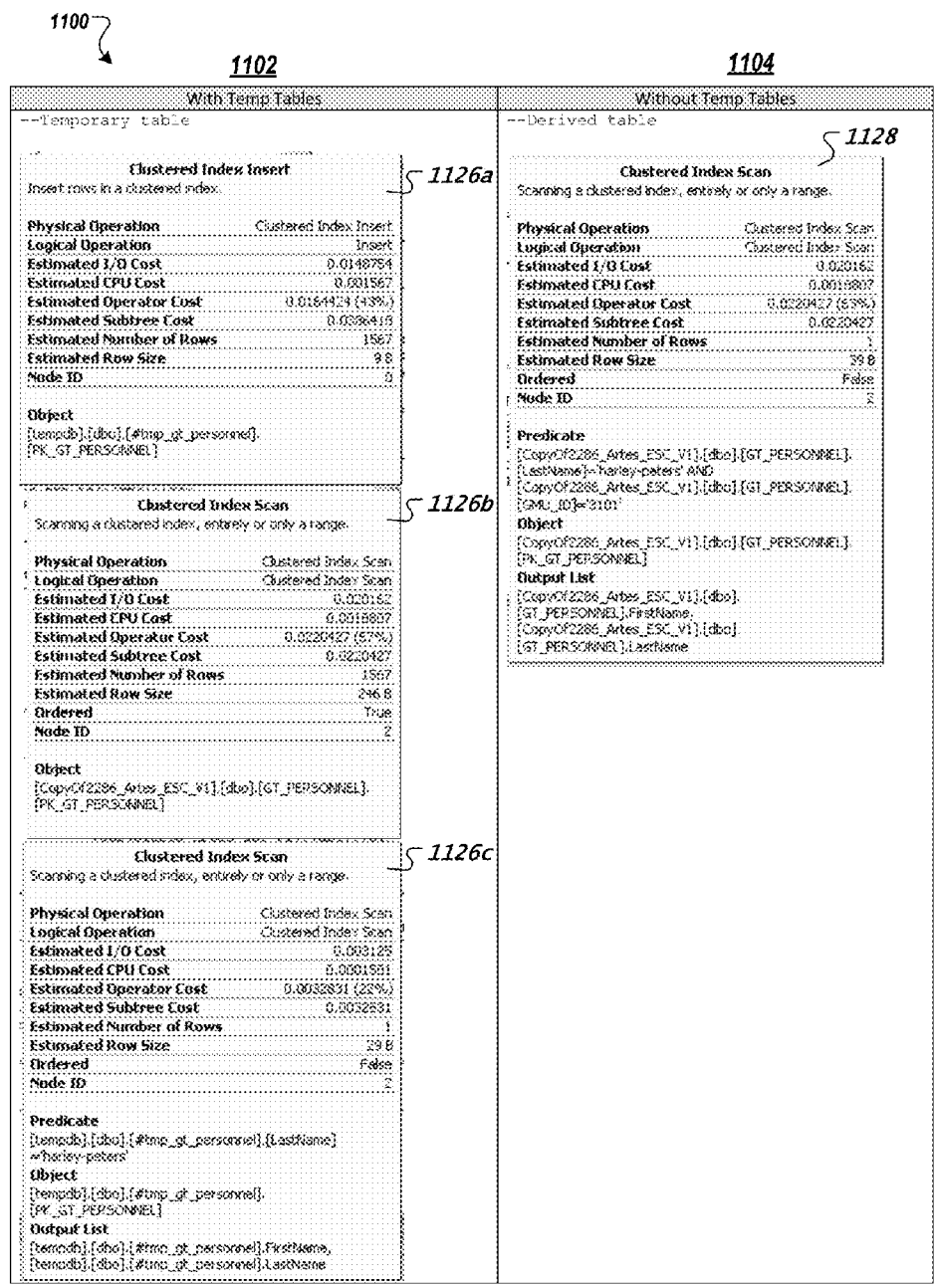

FIG. 11D shows temporary table definitions 1126*a-c* that indicate the costs of functions performed by operations used to implement a temporary table. Derived table definition 1128 indicates the costs of functions performed by operations used to implement a derived table.

In some implementations, it may be beneficial to use a temporary table. For example, a temporary table may hold the result of a called store procedure. In another example, a temporary table may reduce the number of rows needed for one or more joins. For example, a temporary table may aggregate data from multiple different sources. In another example, a temporary table may replace cursors. In some implementations, the use of a temporary table may be avoided and a derived table may instead be used. In some implementations, the use of a temporary table may be avoided and table variables may instead be used.

For example, referring to FIG. 1, the query plan evaluate application 108 may evaluate a query plan against knowledge rules (e.g., the use of one or more temporary tables). The evaluation determines the query plan uses temporary tables based on the I/O statistics 1108 for the query plan. The query plan evaluate application 108 may provide a warning indicating the use of one or more temporary tables. A tip may be a suggestion to the user to avoid, in general, the use of temporary tables. The temporary tables may be created in the tempdb database, which requires additional overhead for the SQL server, slowing down the overall system performance. In addition, table locking can occur when using the temporary tables particularly when the temporary tables are created and populated using a transaction. A tip to the user may highlight the benefit of using a derived table instead of a temporary table. A derived table requires fewer steps for implementation. For example, when using derived tables, the server computing system 104 may perform table interactions in memory. For example, when using temporary tables, the server computing system 104 may perform table interactions in memory and on disk. The use of temporary tables involves a greater number of interactions and I/O transactions as compared to the use of derived tables.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
receiving a particular query plan comprising a plurality of query operations, the query plan selected by a user for evaluation;
accessing, by one or more computers, one or more rules that identify query operations that degrade performance of a query plan or that render a query plan inoperable, wherein each of the one or more rules that identify query operations that degrade the performance of a query plan are associated with a single warning rating, and each of the one or more rules that identify query operations that render a query plan inoperable are associated with a single failing rating;

evaluating, by the one or more computers, each of the plurality of query operations against the one or more rules;

automatically identifying, by the one or more computers based on the evaluation of each of the plurality of query operations against the one or more rules, one or more query operations included in the particular query plan that violate one or more of the rules;

determining, for each of the one or more identified query operations that violate one or more of the rules, whether the rule violated by an identified query operation indicates that the identified query operation degrades performance of the particular query plan, or that the identified query operation renders the particular query plan inoperable;

assigning, for each of the one or more identified query operations that violate one or more of the rules, the rating associated with the rule violated by an identified query operation, wherein the assigned rating is (i) the single warning rating if the violated rule indicates that the identified query operation degrades performance of the particular query plan, or (ii) the single failure rating if the violated rule indicates that the identified query operation renders the particular query plan inoperable;

assigning an overall rating to the particular query plan based on the rating assigned to each of the one or more identified query operations, the overall rating being one of the single warning rating or the single failing rating;

generating a report that references: (i) the one or more identified query operations that violate one or more of the rules, (ii) the assigned rating for each of the identified one or more query operations that violate one or more of the rules, and (iii) the assigned overall rating for the particular query plan; and providing the report for output to the user;

wherein the report further comprises:
- a reason for the rating assigned to each of the one or more identified query operations that violate one or more of the rules, wherein the reason includes the respective violated rule; and
- a hyperlink to a tip for each rating, the tip providing further information regarding the rating, the reason for the rating, and a recommendation for improving the respective identified query operation; and wherein the method further comprises:

receiving a modified particular query plan that the user has selected for evaluation, wherein one or more of the identified query operations are modified based on the rating for the respective query operation, the reason for the rating for the respective query operation, and the recommendation for improving the respective query operation.

2. The method of claim 1, wherein the report further comprises:
- a reason for the rating assigned to each of the one or more identified query operations that violate one or more of the rules, wherein the reason includes the respective violated rule; and
- a hyperlink to a tip for each rating, the tip providing further information regarding the rating, the reason for the rating, and a recommendation for improving the respective identified query operation; and wherein the method further comprises:

receiving a modified particular query plan that the user has selected for evaluation, wherein one or more of the identified query operations are deleted based on the rating for the respective query operation, the reason for the rating for the respective query operation, and the recommendation for improving the respective query operation.

3. The method of claim 1, wherein automatically identifying one or more query operations included in the particular query plan that violate one or more of the rules comprises automatically identifying a query operation that includes a request to perform a table scan.

4. The method of claim 3, further comprising suggesting parameters for a new index in response to automatically identifying a query operation that includes the request to perform a table scan.

5. The method of claim 1, wherein automatically identifying one or more query operations included in the particular query plan that violate one or more of the rules comprises automatically identifying a query operation that includes a request to create or use a temporary table.

6. The method of claim 5, wherein automatically identifying a query operation that includes a request to create or use a temporary table comprises automatically identifying a "create table" command in context with a hash character.

7. The method of claim 1, wherein automatically identifying one or more query operations included in the particular query plan that violate one or more of the rules comprises automatically identifying a query operation that includes a request to perform an outer join operation.

8. The method of claim 1, wherein automatically identifying one or more query operations included in the particular query plan that violate one or more of the rules comprises automatically identifying a query operation that includes a request to perform an implicit conversion.

9. The method of claim 8, wherein automatically identifying a query operation that includes a request to perform an implicit conversion operation comprises automatically identifying a "convert_implicit" command.

10. The method of claim 1, wherein automatically identifying one or more query operations included in the particular query plan that violate one or more of the rules comprises automatically identifying a query operation that includes more than a predetermined number of table join operations.

11. The method of claim 10, wherein the predetermined number is five.

12. The method of claim 1, wherein automatically identifying one or more query operations included in the particular query plan that violate the one or more of the rules comprises automatically identifying a query operation that includes a request to return distinct query results.

13. The method of claim 12, wherein automatically identifying a query operation that includes a request to return distinct query results comprises identifying a "select distinct" command.

14. The method of claim 1, wherein automatically identifying one or more query operations included in the particular query plan that violate one or more of the rules comprises automatically identifying that a query returns more than a predetermined amount of data.

15. The method of claim 14, wherein the predetermined amount comprises one thousand rows.

16. The method of claim 14, wherein automatically identifying that a query returns more than a predetermined amount of data further comprises automatically determining that a value associated with a "row count" parameter exceeds the predetermined amount.

17. A system comprising:
one or more computers; and
a computer-readable medium coupled to the one or more computers having instructions stored thereon which, when executed by the one or more computers, cause the one or more computers to perform operations comprising:
receiving a particular query plan comprising a plurality of query operations, the query plan selected by a user for evaluation;
accessing, by the one or more computers, one or more rules that identify query operations that degrade performance of a query plan or that render a query plan inoperable, wherein each of the one or more rules that identify query operations that degrade the performance of a query plan are associated with a single warning rating, and each of the one or more rules that identify query operations that render a query plan inoperable are associated with a single failing rating;
evaluating, by the one or more computers, each of the plurality of query operations against the one or more rules;
automatically identifying, by the one or more computers based on the evaluation of each of the plurality of query operations against the one or more rules, one or more query operations included in the particular query plan that violate one or more of the rules;
determining, for each of the one or more identified query operations that violate one or more of the rules, whether the rule violated by an identified query operation indicates that the identified query operation degrades performance of the particular query plan, or that the identified query operation renders the particular query plan inoperable;
assigning, for each of the one or more identified query operations that violate one or more of the rules, the rating associated with the rule violated by an identified query operation, wherein the assigned rating is (i) the single warning rating if the violated rule indicates that the identified query operation degrades performance of the particular query plan, or (ii) the single failure rating if the violated rule indicates that the identified query operation renders the particular query plan inoperable;
assigning an overall rating to the particular query plan based on the rating assigned to each of the one or more identified query operations, the overall rating being one of the single warning rating or the single failing rating;
generating a report that references: (i) the one or more identified query operations that violate one or more of the rules, (ii) the assigned rating for each of the identified one or more query operations that violate one or more of the rules, and (iii) the assigned overall rating for the particular query plan; and
providing the report for output to the user;
wherein the report further comprises:
a reason for the rating assigned to each of the one or more identified query operations that violate one or more of the rules, wherein the reason includes the respective violated rule; and
a hyperlink to a tip for each rating, the tip providing further information regarding the rating, the reason for the rating, and a recommendation for improving the respective identified query operation; and
wherein the method further comprises:
receiving a modified particular query plan that the user has selected for evaluation, wherein one or more of the identified query operations are modified based on the rating for the respective query operation, the reason for the rating for the respective query operation, and the recommendation for improving the respective query operation.

18. A non-transitory computer storage medium encoded with a computer program, the program comprising instructions that when executed by one or more computers cause the one or more computers to perform operations comprising:
receiving a particular query plan comprising a plurality of query operations, the query plan selected by a user for evaluation;
accessing, by the one or more computers, one or more rules that identify query operations that degrade performance of a query plan or that render a query plan inoperable, wherein each of the one or more rules that identify query operations that degrade the performance of a query plan are associated with a single warning rating, and each of the one or more rules that identify query operations that render a query plan inoperable are associated with a single failing rating;
evaluating, by the one or more computers, each of the plurality of query operations against the one or more rules;
automatically identifying, by the one or more computers based on the evaluation of each of the plurality of query operations against the one or more rules, one or more query operations included in the particular query plan that violate one or more of the rules;
determining, for each of the one or more identified query operations that violate one or more of the rules, whether the rule violated by an identified query operation indicates that the identified query operation degrades performance of the particular query plan, or that the identified query operation renders the particular query plan inoperable;
assigning, for each of the one or more identified query operations that violate one or more of the rules, the rating associated with the rule violated by an identified query operation, wherein the assigned rating is (i) the single warning rating if the violated rule indicates that the identified query operation degrades performance of the particular query plan, or (ii) the single failure rating if the violated rule indicates that the identified query operation renders the particular query plan inoperable;
assigning an overall rating to the particular query plan based on the rating assigned to each of the one or more identified query operations, the overall rating being one of the single warning rating or the single failing rating;
generating a report that references: (i) the one or more identified query operations that violate one or more of the rules, (ii) the assigned rating for each of the identified one or more query operations that violate one or more of the rules, and (iii) the assigned overall rating for the particular query plan; and
providing the report for output to the user;
wherein the report further comprises:
a reason for the rating assigned to each of the one or more identified query operations that violate one or more of the rules, wherein the reason includes the respective violated rule; and
a hyperlink to a tip for each rating, the tip providing further information regarding the rating, the reason for the rating, and a recommendation for improving the respective identified query operation; and wherein the method further comprises:

receiving a modified particular query plan that the user has selected for evaluation, wherein one or more of the identified query operations are modified based on the rating for the respective query operation, the reason for the rating for the respective query operation, and the recommendation for improving the respective query operation.

19. A computer-implemented method for evaluating a particular query plan, the method comprising:

receiving a particular query plan comprising a plurality of query operations, the query plan selected by a user for evaluation;

accessing, by one or more computers, one or more rules that identify query operations that degrade performance of a query plan or that render a query plan inoperable, wherein each of the one or more rules that identify query operations that degrade the performance of a query plan are associated with a single warning rating, and each of the one or more rules that identify query operations that render a query plan inoperable are associated with a single failing rating;

evaluating, by the one or more computers, the particular query plan, wherein the evaluating comprises:

analyzing encoded information included in the particular query plan in order to produce the plurality of query operations;

evaluating each of the plurality of query operations against the one or more rules;

identifying, based on the evaluation of each of the plurality of query operations against the one or more rules, one or more query operations included in the particular query plan that violate one or more of the rules;

determining, for each of the one or more identified query operations that violate one or more of the rules, whether the rule violated by an identified query operation indicates that the identified query operation degrades performance of the particular query plan, or that the identified query operation renders the particular query plan inoperable;

assigning, for each of the one or more identified query operations that violate one or more of the rules, the rating associated with the rule violated by an identified query operation, wherein the assigned rating is (i) the single warning rating if the violated rule indicates that the identified query operation degrades performance of the particular query plan, or (ii) the single failure rating if the violated rule indicates that the identified query operation renders the particular query plan inoperable; and assigning an overall rating to the particular query plan based on the rating assigned to each of the one or more identified query operations, the overall rating being one of the single warning rating or the single failing rating;

generating, based on the evaluation, a report that references: (i) the one or more identified query operations that violate one or more of the rules, (ii) the assigned rating for each of the identified one or more query operations that violate one or more of the rules, and (iii) the assigned overall rating for the particular query plan; and providing the report for output to the user;

wherein the report further comprises:

a reason for the rating assigned to each of the one or more identified query operations that violate one or more of the rules, wherein the reason includes the respective violated rule; and a hyperlink to a tip for each rating, the tip providing further information regarding the rating, the reason for the rating, and a recommendation for improving the respective identified query operation; and wherein the method further comprises:

receiving a modified particular query plan that the user has selected for evaluation, wherein one or more of the identified query operations are modified based on the rating for the respective query operation, the reason for the rating for the respective query operation, and the recommendation for improving the respective query operation.

20. The method of claim 19, wherein the particular query plan is an extensible markup language (XML) document comprising information encoded in XML.

21. The method of claim 19, wherein a query operation that may degrades the performance of the particular query plan is one of an outer join, a table scan, or an implicit conversion.

22. The method of claim 19, wherein a query operation that degrades the performance of the particular query plan comprises more than a predetermined number of table joins.

23. The method of claim 19, wherein a query operation that the performance of the particular query plan comprises a query operation returning more than a predetermined number of rows of data.

24. The method of claim 19, wherein a query operation that degrades the performance of the particular query plan comprises an operation that uses the DISTINCT keyword in a SELECT statement.

25. The method of claim 19, wherein a query operation that degrades the performance of the particular query plan comprises a query operation that uses a temporary table.

26. The method of claim 19, further comprising altering the particular query plan to remove one or more of the one or more identified query operations that violate one or more of the rules.

27. The method of claim 19, wherein the report further comprises:

a hyperlink to a tip for the rating assigned to each of the one or more identified query operations that violate one or more of the rules, the tip providing further information regarding the rating, the reason for the rating, and a recommendation for improving the respective identified query operation.

28. The method of claim 27, wherein the tip is included in an article associated with the hyperlink.

* * * * *

UNITED STATES PATENT AND TRADEMARK OFFICE
CERTIFICATE OF CORRECTION

PATENT NO. : 8,666,970 B2  
APPLICATION NO. : 13/010136  
DATED : March 4, 2014  
INVENTOR(S) : Scott A. Albrecht and Joshua Davidson Page 1 of 1

It is certified that error appears in the above-identified patent and that said Letters Patent is hereby corrected as shown below:

In the Claims

In claim 21, column 24, line 28, delete "may degrades" and insert -- degrades --, therefor.

In claim 23, column 24, line 34, before "the performance" insert -- degrades --, therefor.

Signed and Sealed this  
Tenth Day of June, 2014

Michelle K. Lee  
*Deputy Director of the United States Patent and Trademark Office*